United States Patent
Grozdina et al.

(10) Patent No.: US 12,482,162 B2
(45) Date of Patent: Nov. 25, 2025

(54) DYNAMIC INTERACTIONS BETWEEN AVATAR ATTACHMENTS

(71) Applicant: VRChat Inc., San Francisco, CA (US)

(72) Inventors: Chase Irish Grozdina, Hilliard, OH (US); David E. Tin Nyo, San Francisco, CA (US); Ronald John Millar, San Rafael, CA (US)

(73) Assignee: VRCHAT INC., San Francisco, CA (US)

( * ) Notice: Subject to any disclaimer, the term of this patent is extended or adjusted under 35 U.S.C. 154(b) by 5 days.

(21) Appl. No.: 17/966,540

(22) Filed: Oct. 14, 2022

(65) Prior Publication Data
US 2024/0127520 A1    Apr. 18, 2024

(51) Int. Cl.
G06T 13/40    (2011.01)
A63F 13/56    (2014.01)
A63F 13/577   (2014.01)

(52) U.S. Cl.
CPC .............. *G06T 13/40* (2013.01); *A63F 13/56* (2014.09); *A63F 13/577* (2014.09); *A63F 2300/643* (2013.01)

(58) Field of Classification Search
None
See application file for complete search history.

(56) References Cited

U.S. PATENT DOCUMENTS

| 2006/0181535 | A1* | 8/2006 | Watt ........................ A63F 13/63 345/473 |
| 2006/0274068 | A1 | 12/2006 | Barthelet |
| 2009/0088236 | A1* | 4/2009 | Laude .................. G07F 17/326 463/10 |
| 2010/0240453 | A1 | 9/2010 | Tsunashima et al. |

(Continued)

FOREIGN PATENT DOCUMENTS

| JP | 2018175849 A | 11/2018 |
| WO | 2018/118266 A1 | 6/2018 |

OTHER PUBLICATIONS

Spanlang B et al.. "GPU based detection and mapping of collisions for haptic rendering in Immersive Virtual Reality", Haptic Audo-Visual Enviroments and Games (HAVE), 2010 IEEE International Symposium on, IEEE, Piscataway, NJ, USA, Oct. 16, 2010 (Oct. 16, 2010), pp. 1-4, XP013791840; ISBN: 978-1-4244-6507-1.

(Continued)

*Primary Examiner* — Kyle Zhai
(74) *Attorney, Agent, or Firm* — Polsinelli PC

(57) ABSTRACT

The present technology pertains to supporting contact interactions between avatars. For example, the present technology supports collisions between a collider and a receiver on avatars and effectuating a resulting effect. In another example, the present technology supports contact interactions that result in secondary motion behaviors from portions of an avatar. Portions of an avatar can be manipulated by forces from colliders that are exerted on the portions of the avatar configured with secondary motion. In addition to (Continued)

supporting interactions between avatars and portions of avatars, the present technology also solves other problems that are collateral to the supporting of contact interactions between avatars. One such problem is one of consent to engage in contact between avatars.

20 Claims, 14 Drawing Sheets

(56) References Cited

U.S. PATENT DOCUMENTS

| | | | | |
|---|---|---|---|---|
| 2013/0286004 | A1* | 10/2013 | McCulloch | G06T 19/006 |
| | | | | 345/419 |
| 2014/0375657 | A1* | 12/2014 | Fortini | G06F 9/542 |
| | | | | 345/502 |
| 2017/0091976 | A1* | 3/2017 | O'Sullivan | G11B 27/00 |
| 2018/0214767 | A1* | 8/2018 | Oh | G06T 13/20 |
| 2019/0160378 | A1* | 5/2019 | Fajt | A63F 13/5255 |
| 2021/0026134 | A1* | 1/2021 | Harkins | B60K 35/60 |
| 2023/0260156 | A1* | 8/2023 | Wedig | G06N 3/048 |
| | | | | 382/154 |
| 2024/0144573 | A1* | 5/2024 | Agrawal | G06T 13/40 |

OTHER PUBLICATIONS

Japanese Notice of Reasons for Refusal, dated Apr. 24, 2025, application # 2024-526852.

* cited by examiner

| | First Avatar Setting | Second Avatar Setting | Friends | Contact allowed? |
|---|---|---|---|---|
| 702 | allow avatar contact interactions with all avatars | allow avatar contact interactions with all avatars | Yes/No | Yes |
| 704 | allow avatar contact interactions only with avatars in a friends list | allow avatar contact interactions with all avatars | No | No |
| 706 | allow avatar contact interactions only with avatars in a friends list | allow avatar contact interactions with all avatars | Yes | Yes |
| 708 | disallow all avatar contact interactions | allow avatar contact interactions with all avatars | Yes/No | No |
| 710 | allow avatar contact interactions with all avatars except *second avatar* | allow avatar contact interactions with all avatars | Yes/No | No |
| 712 | disallow all avatar contact interactions except *second avatar* | allow avatar contact interactions with all avatars | Yes/No | Yes |
| 714 | disallow all avatar contact interactions except *second avatar* | disallow all avatar contact interactions except *first avatar* | Yes/No | Yes |

FIG. 7

DYNAMIC INTERACTIONS BETWEEN AVATAR ATTACHMENTS

BACKGROUND

Users of computing systems utilize avatars to stand in for their physical presence in a variety of applications ranging from simple chat applications to elaborate three-dimensional (3D) environments used in video game applications and virtual reality applications. A simple version of an avatar could be a shape of the shoulders and a head without any distinguishing features. Some avatars can be complex and can be associated with detailed graphics, textures, and can be capable of various animations. For example, some avatars include a number of portions that are separately animated for realistic or non-realistic motion, e.g. hair, tails, ears, clothing, etc.

BRIEF DESCRIPTION OF THE SEVERAL VIEWS OF THE DRAWINGS

Details of one or more aspects of the subject matter described in this disclosure are set forth in the accompanying drawings and the description below. However, the accompanying drawings illustrate only some typical aspects of this disclosure and are therefore not to be considered limiting of its scope. Other features, aspects, and advantages will become apparent from the description, the drawings and the claims.

FIG. 7 illustrates an example table of example contact settings and whether those settings result in a contact interaction being allowed or not in accordance with some aspects of the present technology.

DETAILED DESCRIPTION

Figure 1:
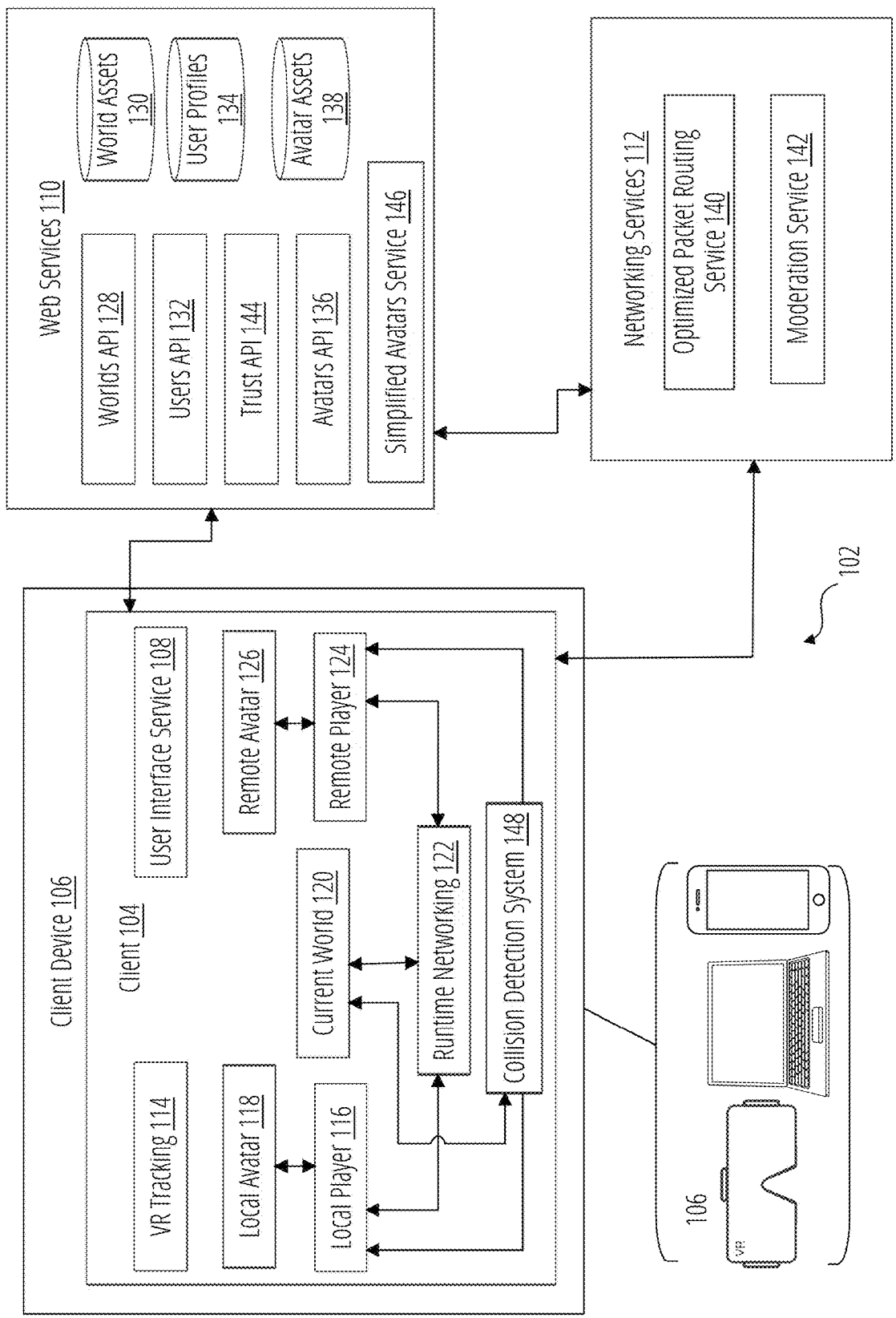
FIG. 1 illustrates an example virtual world platform for playing and hosting a multiplayer virtual reality (VR) experience in accordance with some aspects of the present technology.

Interactions between users in virtual worlds such as those hosted by some virtual reality platforms continue to evolve. Initially interactions we limited to co-existing in the same world and playing a game together. Interactions progressed to live communications, and then to attending virtual events together. Recently, users have begun to increase the range of motion of their avatars so that they can interact more physically in these virtual worlds. For example, people can now exercise or dance at a nightclub in virtual worlds.

The next progression in interactions between people (though their avatars) in virtual worlds is physical interaction. That is, there was a need in the art to support physical interactions between avatars. The present technology solves this problem and other related problems related to contact-based interactions between avatars.

While it was previously possible for a portion of an avatar to contact another portion of an avatar, this was no more than two objects in space being proximate to each other. Each avatar occupied a volume in space, and they could bump into each other, but there was no interaction or reaction due to the contact. The present technology can support an avatar that receives a contact interaction to react to the interaction. In some embodiments, the reaction to the interaction could be an animation, sound, or other effect. The present technology can also support ongoing interactions between portions of avatars. For example, the present technology can allow one avatar to comb the hair of another avatar.

The present technology includes a software development kit for building avatars that allow users to define portions of their avatars as colliders. In some embodiments, some portions of an avatar might automatically be considered a collider, such as hands or other appendages. The present technology also allows a user to define a portion of their avatar as a receiver. The receiver is a portion of an avatar that can trigger an animation, sound, or other effect when contact from a collider is received by the receiver.

The present technology also pertains to a method for detecting collisions between a collider and a receiver and effectuating a resulting effect. Colliders define the shape of an object for the purposes of physical collisions. A collider, which is generally invisible, need not be the exact same shape as the object and in fact, a rough approximation is often more efficient and indistinguishable in gameplay. In some examples, the collider does not need to behave as a solid object and will simply allow other colliders to pass through it.

A receiver can be a collider that is configured with a trigger to cause a resulting effect. When an object enters it the space of a receiver, the receiver will call a function on the to execute scripts configured for the receiver. A scripting system or a physics engine can detect when collisions occur between a collider and a receiver and initiate actions.

The present technology includes a software development kit for building avatars that allow for users to define portions of their avatars to support ongoing interactions. Some portions of avatars are configured to have secondary motion, and such portions of an avatar can be manipulated by forces from colliders that are exerted on the portions of the avatar configured with secondary motion. As will be addressed herein, colliders on the portion of an avatar (the same avatar or another avatar) can interact with portions of the avatar configured with secondary motion to cause movement of the portions of the avatar configured with secondary motion.

Primary motion refers to the explicit movement of the avatar driven by explicit inputs to drive movement such as the movement of limbs due to explicit controls to move the limbs, or movement through space such that the volume of space that the avatar occupies translates to a different coordinate location in a virtual world. Secondary motion refers to motion caused by environmental forces such as physical forces that are collateral to the movement of portions of the avatar, wind blowing, or forces applied by other avatars. These motions are created by the physical forces that are applied to the portions of the avatar configured with secondary motion attributes as a result of primary motion. For example, inertial forces and gravity forces are applied to hair that cause the hair to bounce as a result of the primary motion of walking.

In addition to supporting interactions between avatars and portions of avatars, the present technology also solves other problems that are collateral to the supporting of interactions between avatars. One such problem is one of consent. Just because contact interactions are supported, it does not mean that a user wants their avatar to be touched. The nature of virtual reality environments is that users can be intimately connected with their avatars. Often users choose to view the world from a first person point of view such that an interaction where one avatar is touching another avatar can be perceived as a first person contact. Thus, just as some contact is not welcome in the real world, it is not welcome in a virtual world either. Accordingly, the present technology provides a safety framework that declares a user's consent for touching and that disables contact when it is not desired.

Another challenge that is solved by the present technology is to improve the efficiency of the processing required to support such contact interactions. The present technology utilizes an efficient mechanism for detecting when contact interactions are taking place. Detecting overlapping volumes can be a challenging problem, and so an efficient mechanism for making this determination was devised. Another area of efficiency improvement is to separate the secondary motion caused by contact interactions from the main thread used to render the virtual world, which makes supporting the secondary motion of these objects more efficient.

These and other benefits of the present technology will be addressed further herein.

FIG. 1 illustrates an example virtual world platform 102 for playing and hosting a multiplayer virtual reality (VR) experience that is suited to carrying out the present technology. The virtual world platform 102 can connect clients 104 through web services 110 and networking services 112 to socially interact together in a virtual world hosted by virtual world platform 102.

The virtual world platform 102 primarily includes a client 104, which is an instance of an application executed on a client device 106. The client 104 interacts over a network connection with web services 110 which supports client 104 by providing various services through one or more application programming interfaces (APIs). A few of the main services provided by web services 110 are related to supporting virtual worlds through the worlds API 128, user profiles through the users API 132, trust and safety through the trust API 144, and complex avatars through avatars API 136. Web services 110 generally stores and provides long-term state information among other functions.

The client 104 also interacts with networking services 112, which provides communication services between client 104, networking services 112, and a remote instance of client 104 (not shown) to share state information among respective instances of client 104. In particular, state information is received from a plurality of instances of client 104 by networking services 112 as each instance of client 104 controls its local player 116. Networking services 112 can transfer state information about respective players to other instances of client 104 when the local players 116 for the respective client instances are all engaged in gameplay in the same virtual world. The networking services 112 provide optimized packet routing through optimized packet routing service 140 and moderation between one or more clients through moderation service 142.

The client 104 is the runtime environment executing on a particular client device 106. While the present description sometimes refers to client 104, local client, and remote clients, all are instances of the client 104 executing on a respective client device 106. One particular user account is logged into a particular instance of client 104. A local client and remote client are distinguished to illustrate how client 104 handles first person inputs from a user of the client device 106 upon which client 104 is executing and handles third party inputs received from another user operating their client device upon which the remote client is executing.

Client device 106 can be any computing device. While client 104 is particularly adapted to providing an immersive virtual reality experience through interactions that require a VR headset to experience, client 104 can also be run by computers and mobile devices. Some virtual worlds or complex avatars might not be configured to perform well on certain device types, and therefore, while client 104 can operate on many platforms and devices, not all virtual worlds or complex avatars will be available or have full functionality on all client devices 106.

User interface service 108 is one service that is part of client 104. User interface service 108 is configured to provide various user interface elements such as menus that display various user settings, available worlds, saved complex avatars, friends lists, etc. User interface service 108 can populate its menus through interaction with one or more APIs provided by web services 110, while other portions of menus are loaded directly from user interface service 108.

User interface service 108 can provide a menu of available worlds by calling worlds API 128 to retrieve a list of worlds to which the user account logged into client 104 is permitted to enter. Worlds API 128 can retrieve all public worlds from the world assets database 130 and send a list of those to client 104. Additionally, worlds API 128 can request world IDs for any private worlds associated with the user account logged into client 104 and retrieve the private worlds from the world assets database 130 to send to client 104. User interface service 108 can receive user inputs through a hardware interface to navigate through the worlds menu and to receive a selection of a world to visit.

Another user interface provided by user interface service 108 pertains to various user settings. Such settings can pertain to whether the human player is sitting or standing, settings to minimize motion sickness in players that are susceptible to motion sickness when playing in VR, settings to select a complex avatar, settings about how a player might be viewed and by whom a player might be viewed in a virtual world.

One notable user interface provided by the user interface service 108 is the trust and safety menu. User interface service 108 can contact users API 132 to retrieve current trust and safety settings from user profiles database 134 and display these settings in the trust and safety menu. The trust and safety menu provides the user account with the ability to determine which remote players 124 can see the user's avatar (local player 116) or be seen by the user's avatar when they are both in the same world. For example, it may be desirable to avoid interacting with newer users of the virtual world platform 102 since they have not built up trust within the virtual world platform 102. It may also be desirable to limit the features of a remote player's avatar that will be processed by the instance of client 104 to which the local user is logged in. This is because some avatars may have malicious data embedded, or the avatars may be too complex to render without degrading the performance of client device 106. For example, a user account might decide to turn off lights on remote avatars to avoid shaders, disallow custom animations, etc. In some embodiments, each of these options might be set based on how trusted the remote player is. For example, a user account might allow their friend's avatars to have full features, while others only display basic avatar features.

The user interface service 108 can also provide options to mute or block specific remote players. Additionally, the user interface service 108 can provide a panic mode to audio-and-visually mute anybody who is not a friend.

After a user has selected a virtual world from the menu provided by the user interface service 108, client 104 can download an instance of the virtual world by calling the worlds API 128, which can retrieve the virtual world from worlds world assets database 130 and send it to client 104 for execution.

The world assets are large binary files built for a game engine, such as UNITY using an editor with a software development kit (SDK) provided for use with the virtual world platform 102. If a user travels into a world, they need to download that world asset from world assets database 130. If there are already people in that instance of the world, client 104 also needs a list of the avatars of those people so that the avatars can be rendered in the instance of the virtual world.

In some embodiments, a function of the worlds API 128 can confirm that the user account can access the requested world. While the user account should only have the ability to view public worlds in the user interface menu or should only have knowledge of links to worlds that have been shared with the user account, the worlds API 128 can confirm the user account is permitted to access the virtual world as a redundancy measure.

In addition to downloading the instance of the virtual world, the client 104 can also establish a session with networking services 112 for the specific instance of the world. Networking services 112 can provide information about the current state of the instance of the virtual world. For example, networking services 112 can provide a list of remote avatars 126 present in the virtual world instance to client 104. In turn, client 104 can contact the avatars API 136 to download complex avatar assets for the list of remote complex avatars from avatar assets database 138.

If the client 104 does not have assets for the local avatar 118, client 104 can also contact the avatars API 136 to request and receive the local avatar assets. Avatar assets are a single binary file that contains all of the textures and models and animation data needed to render the avatar. In some instances, more complicated features can be included such as data about particle systems or light sources, or if the avatar should obey or defy laws of physics established in a virtual world, or if the avatar has non-standard movement dynamics. In some embodiments the avatar assets include colliders and receivers defined on portions of the avatar, or a tree of transforms that cause portions of the avatar to exhibit secondary motion behaviors (e.g., dynamic or physics bones (aka phys. bones) are examples systems that can configure portions of the avatar to exhibit secondary motion behaviors).

The downloaded instance of the virtual world can be executed by client 104 as current world 120. Current world 120 can include coordinates within the current world 120 where the local player 116 and each remote player 124 are located. The local player 116 and remote player 124 are each collision volumes of space that the respective local player 116 or remote player 124 occupy.

The local avatar 118 can be mapped to the local player 116, and the respective remote avatar 126 can be mapped to their respective remote player 124, thereby allowing each player to appear as their avatar in the current world 120. Movements of the remote avatars 126 are handled by receiving state data about a respective remote avatar/player and rendering the movement or audio by client 104.

The VR tracking service 114 pertains to clients 104 operating on a client device 106 that have access to VR tracking peripherals. For example, some VR headsets have cameras (integrated or external) to track the limbs of players. Many VR headsets can pair with controllers that can report the locations of a user's hands in space. Some client devices 106 include other peripherals configured to perform full skeleton tracking. VR tracking service 114 can fuse all VR inputs connected to the client.

The VR tracking service 114 can map the fused VR inputs to the local player 116 to allow the local player 116 to interact in and with the current world 120. Meanwhile, the local player 116 can interact with the local avatar 118 to map the local avatar 118 to the local player and make the local player 116 appear as their avatar.

In some embodiments, there is diversity in what parts of a user's body are tracked by VR tracking service 114. While some users might have full skeleton tracking, many users may only have the ability to perform hand tracking. To accommodate this disparity in hardware abilities of possible client devices 106, local player 116 can derive portions of a skeleton that are not tracked by VR tracking service 114. For example, if VR tracking service 114 only provides information about hand tracking for a user, the local player can still derive a full skeleton for the user and make portions of the skeleton move to accommodate the movement of the hands. In this way, an avatar's hands are not moving in a way that is disembodied from the rest of the avatar.

The local player 116 is the entity that moves around the environment in the current world 120. It can pick things up and put them down. It does not have any animation and is a collision volume. It can do everything in the world, but it has no appearance and does not need to animate.

The local player is further connected to the networking layer, illustrated as the runtime networking service 122, to broadcast state information about the local player 116 over the network to other users in the current world 120 instance.

The local player 116 and the remote player 124 are similar in that they are collision volumes that move around the environment in the current world 120. The main difference is that the local player 116 is controlled by client 104, and the user of client 104 is authoring the experience. In contrast, the remote player 124 is a playback mechanism representing actions being broadcast to the client 104 representing other players present in the current world 120.

As addressed above, the local avatar 118 is overlaid with the local player 116 to give the user a visual appearance. Actions by the local player 116 are animated as the local player interacts with the current world. For example, while the local player 116 can interact to pick up an object in the current world 120, without the local avatar 118, the object would appear to float in the air. With the local avatar 118 overlaid the local player 116, the object now appears to be held by the hand of the avatar.

The remote player 124 and remote avatar 126 work similarly to their local counterparts except for where the inputs that control the remote player 124 come from. The remote player 124 and remote avatar 126 are playback devices for state information received by the runtime networking service 122 from networking services 112. While FIG. 1 only depicts one remote player 124 and remote avatar 126, there can be many.

The client 104 can also support contact interactions between avatars, a portion of an avatar with another portion of the same avatar, or a portion of an avatar with an object in a virtual world. In order to detect these interactions, the client 104 can be configured to detect collisions between objects using the collision detection system 148. In some embodiments, the collision detection system 148 can be a broad phase collision detection system.

The current world 120 also has features that require networking. The current world 120 could have objects, like scissors or a light switch, that a user can pick up, and the object needs to broadcast its state across the network so that other users in the current world 120 can view the current state of the object.

Each of the local player 116, current world 120, and remote player 124 are connected to the runtime networking service 122. The local player 116 primarily transmits updated state information for the local player 116 to remote instances of client 104 that are also executing the same virtual world. The current world 120 can transmit and receive state information about the instance of the virtual world. The current world executing on client 104 transmits state information when the state change is owned by the local player 116 and receives state information when the state change is owned by the remote player 124.

Networking services 112 are the network-side part of the networking layer of the virtual world platform 102. In some embodiments, portions of the networking services 112 are provided by a networking plug-in such as the PHOTON networking engine, which broadcasts state information to all users in an instance of a virtual world.

In addition to the general broadcasting of state information to all users interacting with an instance of a virtual world, the optimized packet routing service 140 provides more advanced features that provide an enhanced user experience and enforces other virtual world platform 102 properties, such as trust and safety configurations.

For example, to provide an enhanced user experience, the optimized packet routing service 140 can filter out voice packets coming from a remote player 124 that might be far from the local player 116 in the instance of the current world 120. Without such optimization, remote players 124 that are not interacting or even visible to the local player might receive audio packets from tens or even hundreds of remote players 124 that would make it hard to communicate with any subsets of remote players 124.

In another example, the optimized packet routing service 140 can enforce trust and safety configurations. As addressed above, trust and safety configurations can specify specific user accounts or groups of user accounts to be filtered so that they cannot interact with the local player 116 or have limited interactions with the local player 116. The optimized packet routing service 140 can call trust API 144 to learn of a list of remote players 124 that might need to be subject to some level of filtering or blocking of network traffic going to or coming from the client 104 for the local player 116 having the trust and safety configurations.

The trust API 144 can determine which remote players 124 should be blocked for the local player 116 or which remote players 124 should have aspects of their complex avatar limited. Some of these determinations are based on logic and rules that categorize remote players 124 based on quantities and types of past interactions with the virtual worlds platform 102. Trust API 144 may make these determinations by using settings stored in the user profile of the local player 116 and comparing these settings to data stored in user profiles of remote players 124.

Another of the networking services 112 is a moderation service 142 that can provide conflict resolutions and access control. For example, before a user accesses a world, especially a private world, moderation service 142 can call the worlds API 128 to ensure the user can enter the world. In another example, there can be instances where two different users attempt to claim control of an object in a virtual world at approximately the same time. The moderation service 142 can handle those sorts of conflicts by selecting a particular user to control an object until they relinquish the control of the object, which allows another user to claim control of the object. A user that has control of the object can broadcast packets informing remote players 124 of the state of that object.

In some embodiments, client 104, virtual worlds, and complex avatars can be configured to operate in a particular game engine, especially a game engine that supports three-dimensional (3D) environments. Two common game engines include UNITY and UNREAL ENGINE.

In some embodiments, to be supported by virtual world platform 102, virtual worlds and complex avatars need to be developed in compliance with a software development kit (SDK). For example, complex avatars require a particular script to be usable in the virtual world platform 102. In another example, there can be a number of requirements that need to be followed to get the animations of an avatar to play. In some embodiments, the SDK can define other necessary details to support particular client devices. For example, the SDK can define specific shaders to be used if the avatar is to be used on the OCULUS QUEST VR headset.

In some embodiments, the SDK requires virtual worlds to utilize a particular coding language to ensure the world has compliant behaviors. For example, the SDK can require that behaviors in worlds are defined using UDON, a programming language specific to a particular virtual world platform 102, VRCHAT. In some embodiments, the programming language facilitates a world built using the programming language to comply with file access safeguards provided by the virtual world platform 102. For example, a world cannot read or write anything to a hard drive, and only approved web pages can be rendered in a world on the virtual world platform 102.

In some embodiments virtual world platform 102 can also include a simplified avatars service 146. As will be described herein, simplified avatars service 146 can create simplified versions of complex avatars and store the avatar assets for the simplified versions of the complex avatars in avatar assets database 138.

While the virtual world platform 102 is suited to carrying out the present technology, persons of ordinary skill in the art will appreciate that the present technology can be used in other environments.

Figure 2:
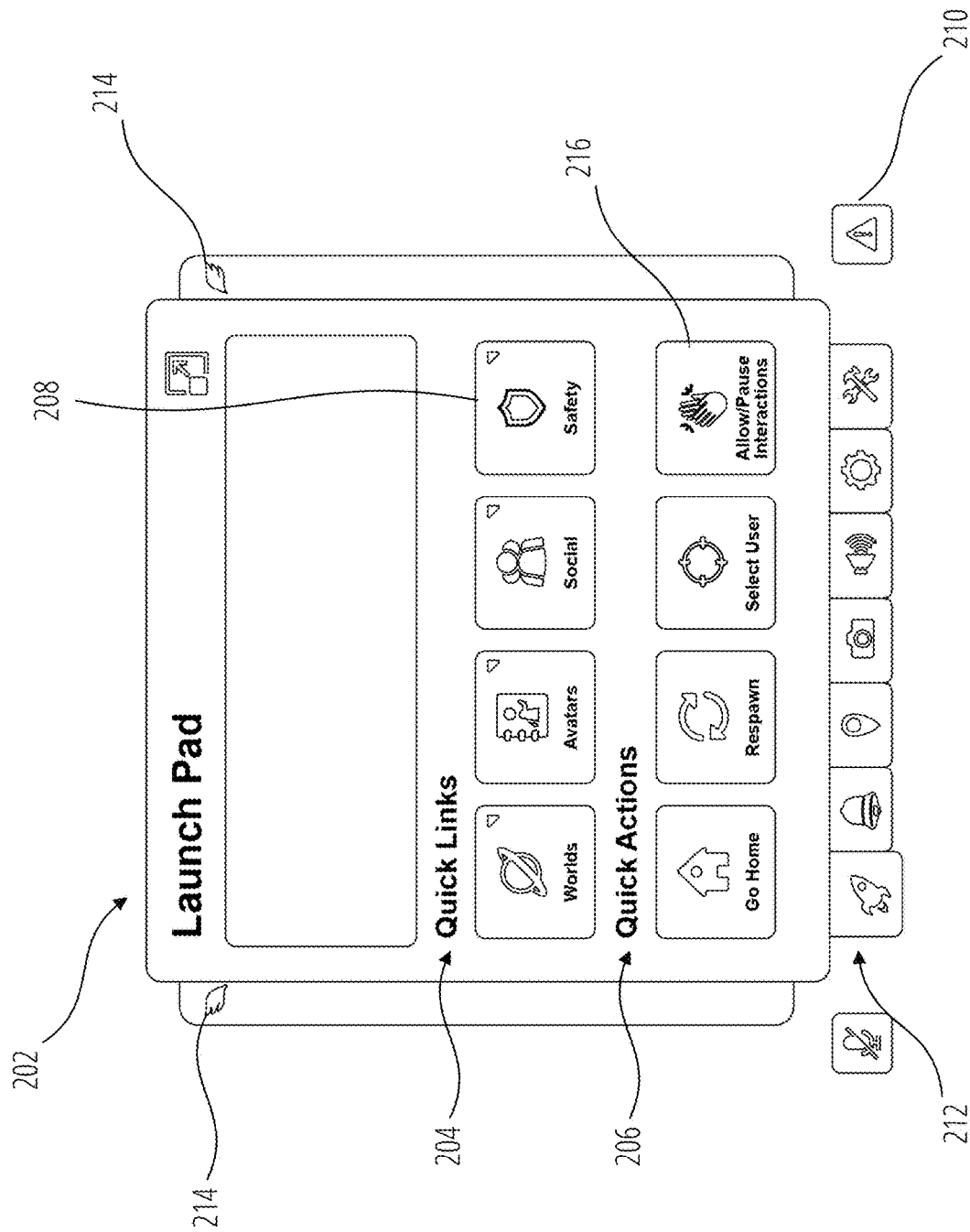
FIG. 2 illustrates an example quick menu in accordance with some aspects of the present technology.

FIG. 2 illustrates an example quick menu 202 in accordance with some aspects of the present technology. In particular, the quick menu 202 can be surfaced by the user interface service 108 on client 104 at any time or place in the virtual world platform 102.

The quick menu 202 includes a quick links 204 section that includes many commonly used menu options such as menus to browse worlds, avatars, friends, and a safety menu 208 to set safety settings for the user's profile.

The trust and safety menu 208 provides the user account with the ability to determine which remote players 124 can see the user's avatar (local player 116) or be seen by the user's avatar when they are both in the same world. For example, it may be desirable to avoid interacting with newer users of the virtual world platform 102 since they have not built up trust within the virtual world platform 102. It may also be desirable to limit the features of a remote player's avatar that will be processed by the instance of client 104 to which the local user is logged in. This is because some avatars may have malicious data embedded, or the avatars may be too complex to render without degrading the performance of client device 106. For example, a user account might decide to turn off lights on remote avatars to avoid shaders, disallow custom animations, etc. In some embodiments, each of these options might be set based on how trusted the remote player is. For example, a user account might allow their friend's avatars to have full features, while others only display basic avatar features.

The user interface service 108 can also provide options to mute or block specific remote players. Additionally, the user interface service 108 can provide a panic or safe mode 210 to audio-and-visually mute anybody who is not a friend.

The quick menu 202 can also include a quick actions 206 section to provide frequently used actions in a convenient location. Some example quick actions include an action to go to your homeworld, to respawn in the last world you were in, to select another user's avatar (to communicate privately, to copy the avatar or other function), and an interactions toggle 216 to toggle interactions between users and the local player 116 on or off.

The quick menu 202 also includes a dock 212, which also provides access to some common features like a virtual camera, volume settings, and a settings menu, among other features.

Throughout this description of the present technology, reference is made to avatars, users, and user accounts. It will be appreciated by those of ordinary skill in the art that avatars are a representation of a user in a virtual environment, and configurations attributed to the avatars are sometimes configurations that are attributable to the user account that is applied to the avatar. Accordingly, the term avatar may be describing an aspect of the user account in some instances. Regardless of which term is used, the proper meaning will be understood by persons of ordinary skill in the art.

Figure 3:
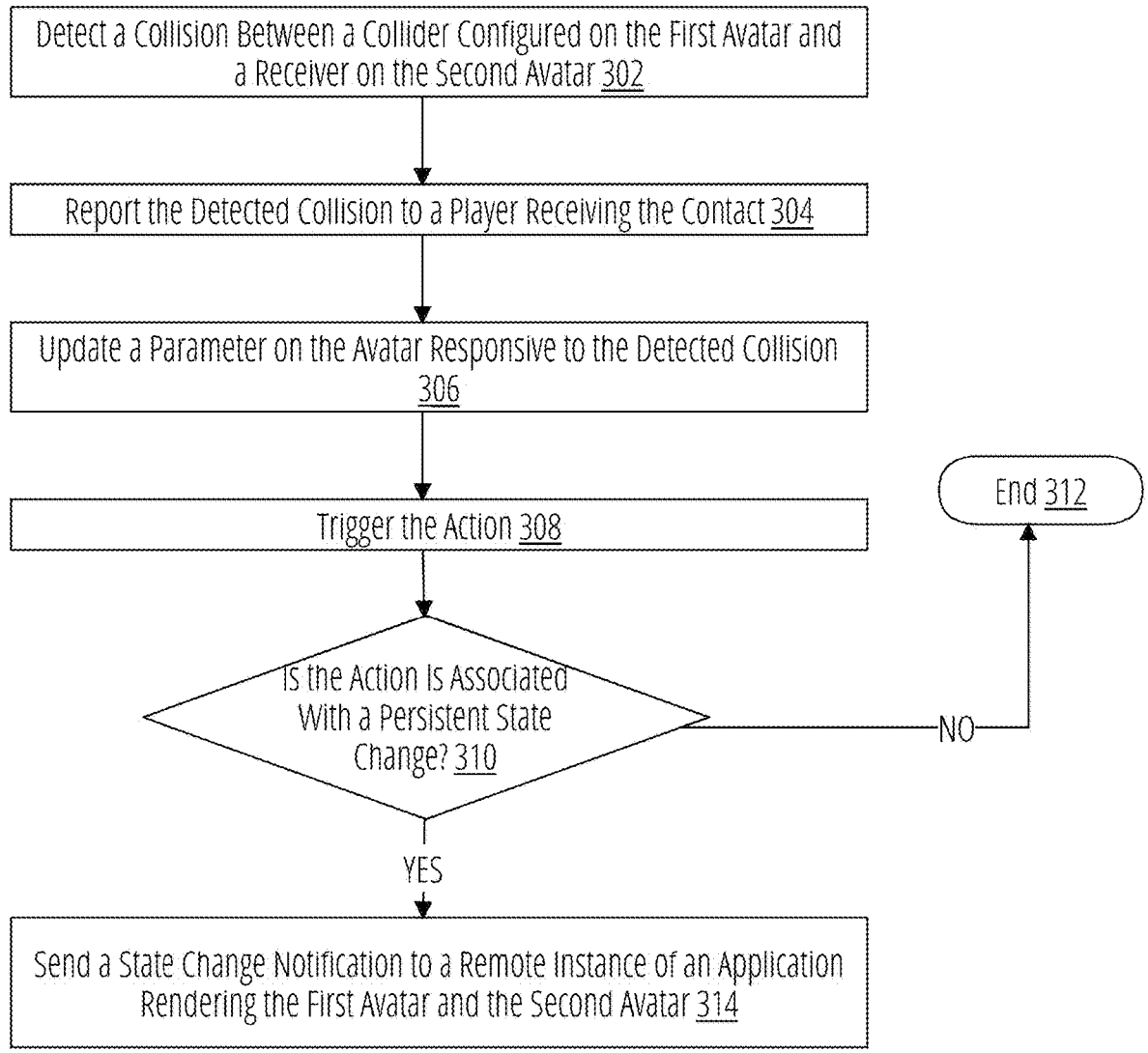
FIG. 3 illustrates an example method for triggering an action responsive to a collision between a first avatar and a second avatar in accordance with some aspects of the present technology.

FIG. 3 illustrates an example method for triggering an action responsive to a collision between a first avatar and a second avatar. Although the example method depicts a particular sequence of operations, the sequence may be altered without departing from the scope of the present disclosure. For example, some of the operations depicted may be performed in parallel or in a different sequence that does not materially affect the function of the method. In other examples, different components of an example device or system that implements the method may perform functions at substantially the same time or in a specific sequence.

As introduced above, the present technology can support an avatar that receives a contact interaction to react to the interaction. In some embodiments, the reaction to the interaction could be an animation, sound, or other effect.

The present technology includes a software development kit for building avatars that allow users to define portions of their avatars as colliders. In some embodiments, some portions of an avatar might automatically be considered colliders, such as portions of hands or other appendages. The present technology also allows a user to define a portion of their avatar as a receiver. The receiver is a portion of an avatar that can trigger an animation, sound, or other effect when contact from a collider is received by the receiver. The present technology also allows a user to define a portion of the avatar configured to exhibit secondary motion behaviors. The secondary motion behaviors can be triggered or effectuated through contact by a collider.

The present technology also pertains to a method for detecting collisions between a collider and a receiver and effectuating a resulting effect as described in the method of FIG. 3.

According to some examples, the method includes detecting a collision between a collider configured on the first avatar and a receiver on the second avatar at block 302. For example, the client 104 illustrated in FIG. 1 may detect a collision between a collider configured on the first avatar and a receiver on the second avatar. The first avatar can be the local avatar 118 or a remote avatar 126. The second avatar can be a remote avatar 126. In other words, the collision can occur between a local avatar and one or more remote avatars or the collision can occur between two or more remote avatars.

Figure 5A:
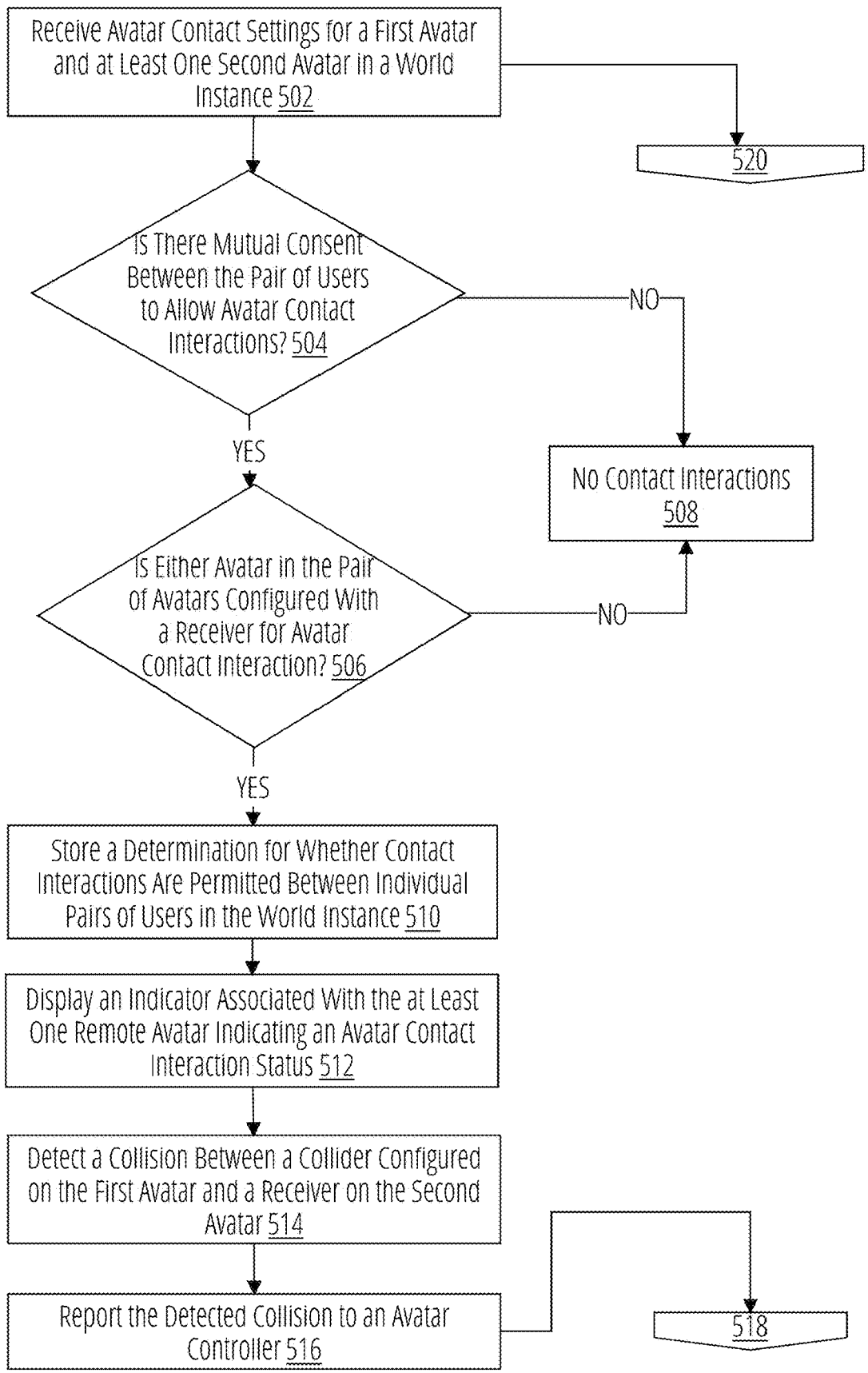
FIG. 5A, FIG. 5B, and FIG. 5C illustrates an example method for determining if avatar contact interactions are permitted in accordance with some aspects of the present technology.
Figure 5B:
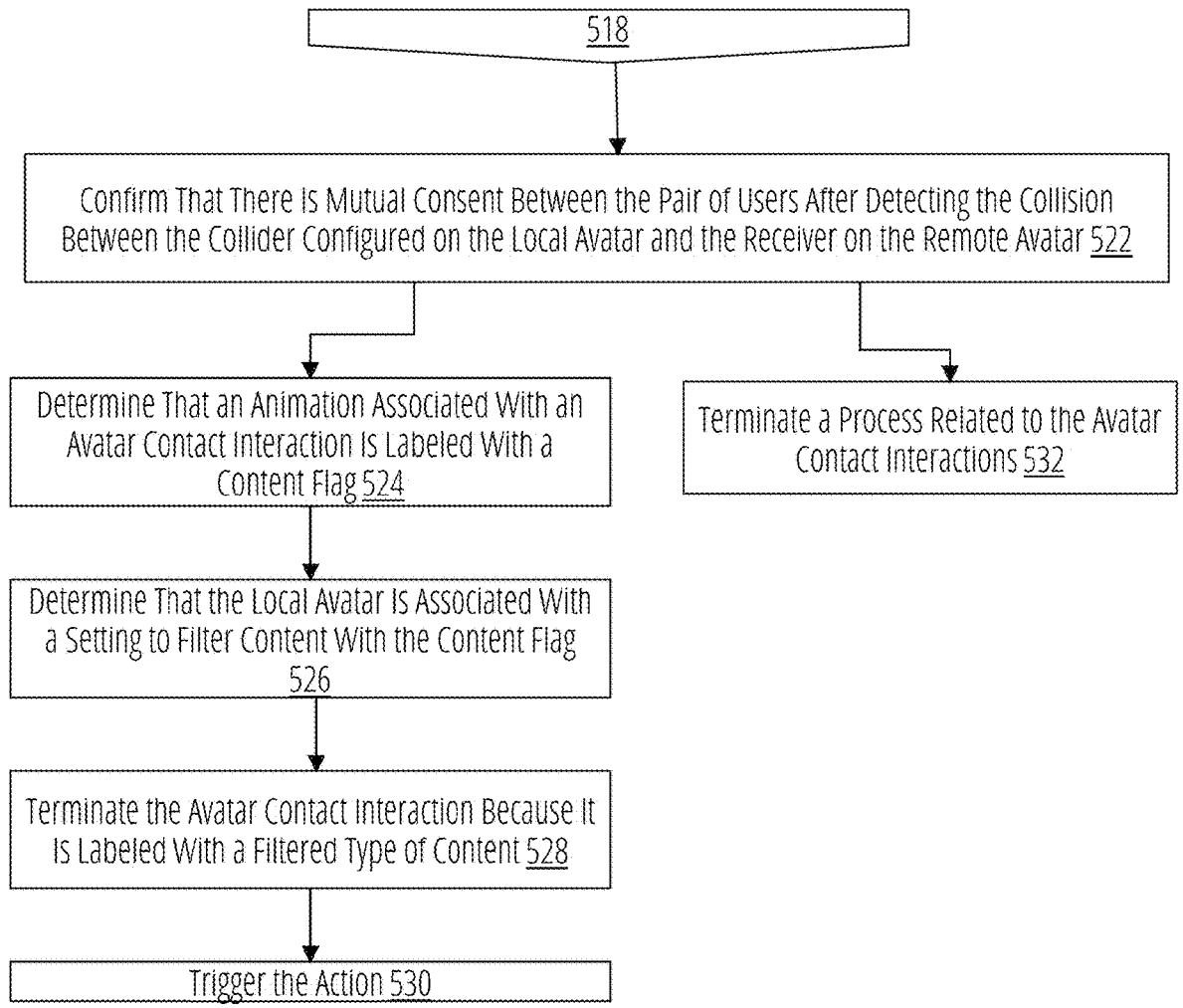

In some embodiments, such as those addressed in more detail with respect to FIG. 5A and FIG. 5B, the collider and receiver may be turned on or off according to a set of rules governing mutual consent for interactions and contact between avatars.

In some embodiments, a collision can be detected by a broad phase collision detection system 148. For example, the broad phase collision detection system 148 can be configured to divide the rendered area of a virtual world into a grid. In one example, the grid can be a grid area covering 10 m×10 m areas, but any suitable area can be used. Each cell in the grid is entered into a dictionary for quick look-ups by a hash created from the XYZ coordinates in a grid space for each grid. Within each grid, the broad phase collision detection system 148 creates a sorted list in a first-in, first-out memory structure, of all objects arranged in order across an axis in the area in the grid. For example, objects can be arranged along the x-axis as they occur in the area in the grid. The broad phase collision detection system 148 determines whether each object is involved in a collision by evaluating the objects one at a time in the order in which they are sorted. Evaluating the objects can include determining whether the object is of a character to be affected by a collision. For example, if the object is not a collider or a receiver, a collision might be irrelevant to the object, and the processing of that object can discontinue. But, if the object can be affected by a collision, the broad phase collision detection system 148 determines whether the object is potentially overlapping another object or being overlapped by another object.

In some embodiments, the detection of the collision by the client 104 can also include determining physical attributes associated with the collision. For example, when a collision is detected by the broad phase collision detection system 148, the client 104 may determine physical attributes associated with the collision. Physical attributes can include attributes such as the physical forces such as force, velocity, mass, etc. of the colliding objects. In some embodiments, the action can be dependent on the physical attributes. For example, if the collision was the result of a high-five motion, sound effects might only be generated when the collider is moving at a velocity greater than a threshold.

According to some examples, the method includes reporting the detected collision to a player receiving the contact at block 304. For example, the broad phase collision detection system 148 executing on the client 104 illustrated in FIG. 1 may report the detected collision to an avatar controller such as local player 116 or remote player 124 illustrated in FIG. 1.

According to some examples, the method includes updating a parameter on the avatar associated with the receiver responsive to the detected collision at block 306. For example, the avatar controller such as local player 116 or remote player 124 illustrated in FIG. 1 may update a parameter on the avatar associated with the receiver responsive to the detected collision. For example, if the remote player 124 is the receiver of the contact interaction, the remote player 124 can update a parameter on the remote avatar 126. In some embodiments, the parameter can be a binary parameter to indicate a collision occurred. In some embodiments, the parameter can be descriptive of the attributes of the contact interaction, such as the type of the collider, the physics of the collision (such as the velocity of one of the objects or the force of the collision), etc.

The receiver can be linked to associated responses to be effectuated when the receiver is activated. The responses can be embodied in data or an algorithm that is part of the avatar package. Some non-limiting examples or responses that can be associated with a receiver can be to cause an animation to play, a sound effect to play, or a state change to occur. For example, in the interaction of a high-five between two avatars, a receiver on one of the avatars can be configured to trigger a slapping sound, animate a custom change or appearance change, or to trigger an animation of any type. The responses can be triggered through the update of the parameter of the avatar.

In some embodiments, mutual consent between the parties to the collision can be confirmed after the collision is reported to the avatar controller (such as local player 116 or remote player 124) and before the parameter change is reported to the avatar (local avatar 118 or remote avatar 126).

According to some examples, if there is mutual consent, the method includes triggering the action at block 308. For example, the client 104 illustrated in FIG. 1 may trigger the action. In some embodiments, the action is triggered by the animation controller that animates the avatar based on the data and parameters associated with the avatar (local avatar 118 or remote avatar 126). Some non-limiting examples or responses that can be associated with a receiver can be to cause an animation to play, a sound effect to play, or a state change to occur.

According to some examples, the method includes determining if the action is associated with a persistent state change for the second avatar at decision block 310. For example, the client 104 illustrated in FIG. 1 may determine if the action is associated with a persistent state change for the second avatar. A persistent state change can include some action that is more than a played animation. For example, an avatar can change its appearance (persistently until changed by the player or another interaction, or for a period of a configured duration) and continue to interact with its changed appearance.

According to some examples, the method includes sending a state change notification to a remote instance of an application rendering the first avatar and the second avatar at block 314. For example, the client 104 illustrated in FIG. 1 may send a state change notification to a remote instance of an application rendering the first avatar and the second avatar through networking services 112.

Figure 4:
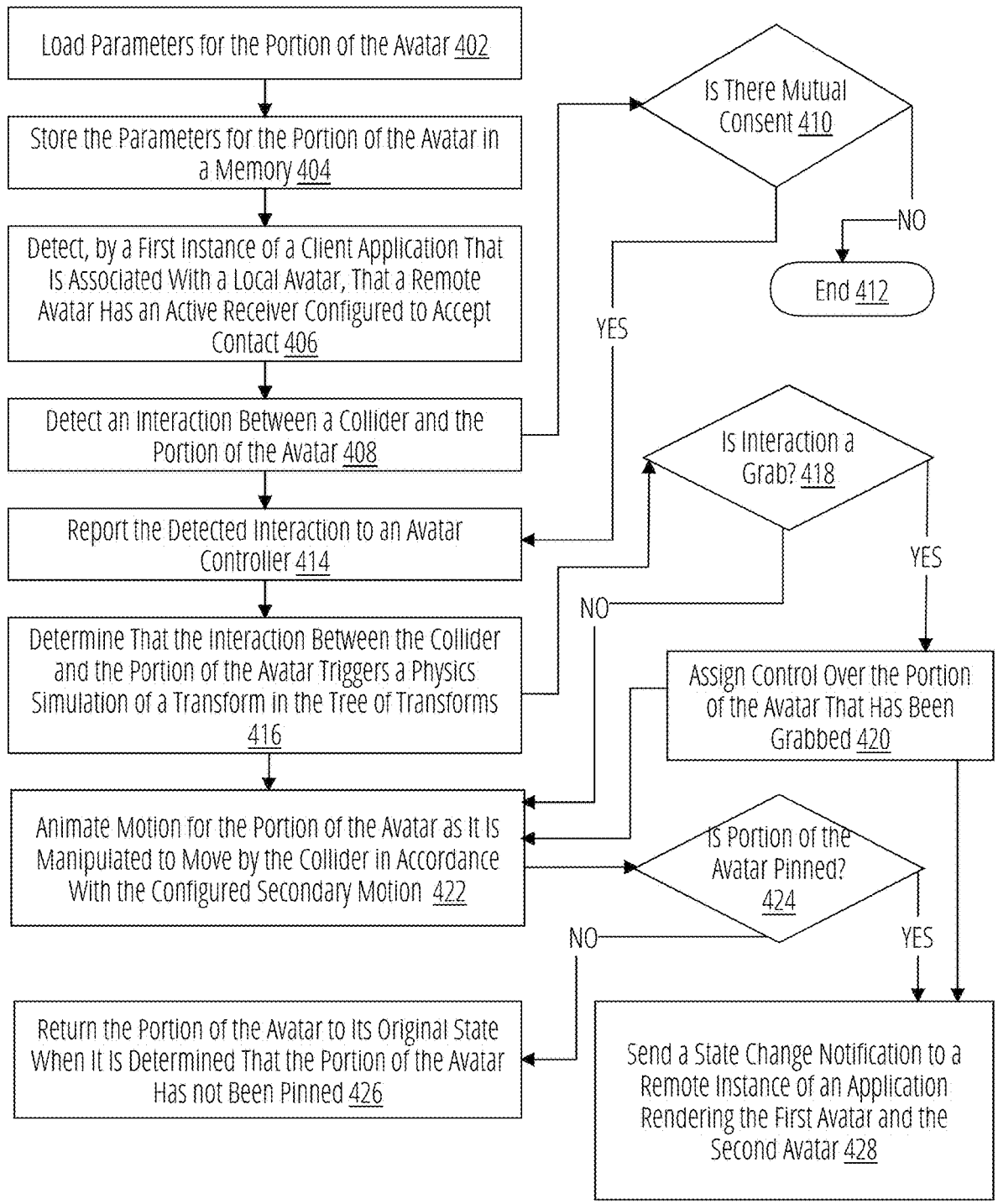
FIG. 4 illustrates an example method for supporting interactions affecting secondary motion of a portion of an avatar in accordance with some aspects of the present technology.

FIG. 4 illustrates an example method for supporting interactions affecting the secondary motion of a portion of an avatar. Although the example method depicts a particular sequence of operations, the sequence may be altered without departing from the scope of the present disclosure. For example, some of the operations depicted may be performed in parallel or in a different sequence that does not materially affect the function of the method. In other examples, different components of an example device or system that implements the method may perform functions at substantially the same time or in a specific sequence.

According to some examples, the method includes instantiating one or more jobs as part of a job system. Jobs can be responsible for handling a task such as evaluating a collision, determining secondary motion behaviors as a result of the collision, etc. The jobs system can perform its tasks by assigning jobs to one or more threads other than the primary thread used for rendering the larger game environment (virtual world). The job can be compiled at runtime for execution on a thread other than the primary thread. In some embodiments, the creation of the job is performed by utilizing the BURST COMPILING feature in the UNITY rendering engine.

The execution of the job is handled by the jobs system, which assigns its own prioritization to the order in which jobs are executed. Accordingly, in some embodiments, the client 104 can check that the job has been completed by the jobs system when a frame needs to be rendered. If the job has not been completed, the method comprises instructing the jobs system to finish the job.

According to some examples, the method includes loading parameters for the avatar at block 402. For example, the client 104 illustrated in FIG. 1 may load parameters for an avatar (e.g., the remote avatar or the local avatar 118). As addressed with respect to FIG. 1, an avatar can be defined by avatar assets. Avatar assets are a single binary file that contains all of the textures and models and animation data needed to render the avatar. In some instances, more complicated features can be included such as data about particle systems or light sources, or if the avatar should obey or defy laws of physics established in a virtual world, or if the avatar has non-standard movement dynamics. The avatar assets can also define portions of an avatar that are designated as colliders and receivers. The avatar assets can also define portions of the avatar that are configured with secondary motion behaviors. The avatar assets can define a complete skeleton of a humanoid avatar or a non-humanoid avatar, and any portion of an avatar can be configured as a collider or receiver. Additionally, any portion of an avatar can be configured with secondary motion behaviors. However, secondary motion behaviors are typically reserved for portions of an avatar that are flexible or pliable, and are not typically used on rigid objects such as the primary skeleton of the avatar as rigid objects are less likely to respond with perceptible movement in response to small forces such as most contact interactions.

The portions of the avatar that are configured for secondary motion are defined by a tree of transforms. For example, a root of the transform can be a head of the avatar, and branches from the root can include strands of hair (or collections of strands of hair). The strands of hair can be represented by a plurality of additional branches. Each branch can be associated with a variety of properties such as whether the portions of the avatar associated with the tree of transforms can be pulled, whether they have spring-like characteristics, how susceptible they are to inertial forces, and how much they should be affected by gravity, etc. In some embodiments, the transforms are configured to be compiled at runtime. More detail regarding the tree of transforms that define portions of an avatar to exhibit secondary motion behaviors is addressed with respect to FIG. 10 and FIG. 11.

According to some examples, the method includes storing the parameters for the avatar, including the portion of the avatar configured to exhibit secondary motion behaviors, in a memory at block 404. For example, the client 104 illustrated in FIG. 1 may store the parameters for the portion of the avatar in a memory in that can be accessed by the jobs system.

In some embodiments, the memory structure storing information regarding the transforms that define portions of an avatar to exhibit secondary motion behaviors are stored in a memory structure that can be accessed by threads controlled by the jobs system running on multiple cores of a multi-core processor. In some embodiments, the memory structure is a flat memory structure such as NATIVECONTAINER provided by UNITY. NATIVECONTAINER allows access to the data by the secondary threads executing jobs and the main thread that is responsible for rendering the virtual world and the objects within it.

According to some examples, the method includes detecting that an avatar has an active contact acceptor configured to accept contact at block 406. For example, the client 104 illustrated in FIG. 1 may detect that an avatar has an active contact acceptor configured to accept contact.

In some embodiments, the contact acceptor is configured to only receive interactions from a specified collider. The specified collider may be a class of collider such as a collider on a finger or hand. The specified collider might be on a specific avatar, or the specified collider might be on a category of avatar such as a humanoid avatar.

According to some examples, the method includes detecting an interaction between a collider and the portion of the avatar configured to exhibit secondary motion behaviors at block 408. For example, the client 104 illustrated in FIG. 1 may detect an interaction between a collider and the portion of the avatar configured to exhibit secondary motion behaviors.

In some embodiments, the detecting the interaction between a collider and the portion of the avatar configured to exhibit secondary motion behaviors occurs at every frame. The detecting the interaction between the collider and the portion of the avatar configured to exhibit secondary motion behaviors can be performed by the broad phase collision detection system 148 addressed with respect to FIG. 3. The broad phase collision detection system can also be handled by a job under the control of the jobs system. The collision job only determines an approximation of collision, but it's not guaranteed to affect the secondary motion. Likely collisions detected by the collision job can be passed to the secondary motion job which actually determines if the colliders are actually contacting a the portion of the avatar configured to exhibit secondary motion behaviors and need to move as a result. This is done for efficiency reasons as it's faster to have all of the collision data inside of the secondary motion job, since it is needed for calculating motion too.

According to some examples, prior to animating motion for the portion of the avatar configured to exhibit secondary motion behaviors as it is manipulated to move by the collider in accordance with the configured secondary motion, the method includes determining whether there is mutual consent between the pair of the first avatar and the second avatar to allow the animated motion at decision block 410. For example, the client 104 illustrated in FIG. 1 may determine whether there is mutual consent between the pair of the first avatar and the second avatar to allow the animated motion. More details regarding mutual consent are addressed with respect to FIG. 5A and FIG. 5B. When there is no mutual consent between the avatars, the method ends 412.

According to some examples, when there is mutual consent between the avatars, the method includes reporting the detected interaction to an avatar controller at block 414. For example, the broad phase collision detection system 148 may report the detected interaction to an avatar controller such as local player 116 or remote player 124.

According to some examples, the method includes determining that the interaction between the collider and the portion of the avatar configured to exhibit secondary motion behaviors triggers a physics simulation of the tree of transforms at block 416. For example, the client 104 illustrated in FIG. 1 may determine that the interaction between the collider and the portion of the avatar configured to exhibit secondary motion behaviors triggers a physics simulation of the transform.

According to some examples, the method includes determining if the interaction is a grab interaction at decision block 418. For example, the client 104 illustrated in FIG. 1 can determine whether the interaction is a grab interaction. A grab interaction can occur when a portion of an avatar has been designated as grab-able.

When the interaction is a grab, according to some examples, the method includes assigning control over the portion of the avatar that has been grabbed at block 420. For example, the client 104 illustrated in FIG. 1 may assign control over the portion of the avatar that has been grabbed. The portion of the avatar that has been grabbed has an attachment point at the location in which the portion of the avatar has been grabbed. Information reporting that a grab has occurred is also transmitted to remote instances of client 104 over the network. More detail with respect to a grab interaction is addressed with respect to FIG. 10.

According to some examples, the method includes animating motion for the portion of the avatar as it is manipulated to move by the collider in accordance with the configured secondary motion at block 422. For example, the client 104 illustrated in FIG. 1 may animate motion for the portion of the avatar as it is manipulated to move by the collider in accordance with the configured secondary motion (configured by the tree of transforms). The executing the job utilizes localized physics. Localized physics are limited to the interaction between the collider and the properties of the tree of transforms and that do not affect any other object in the virtual world. As addressed above, the job is executed on the thread other than the main thread to result in the animation of the motion of the portion of the avatar as it is manipulated to move by the collider in accordance with the configured secondary motion.

In some embodiments, the portion of the avatar configured to exhibit secondary motion behaviors can be left in a pinned state as a result of the manipulation by the collider. According to some examples, the method includes determining whether the portion of the avatar has been pinned at decision block 424. For example, the client 104 illustrated in FIG. 1 can determine whether the portion of the avatar was left in a pinned state. The portion of the avatar configured to exhibit secondary motion behaviors can be left in a pinned state when the avatar with the collider presses a trigger input to pin the portion of the avatar.

According to some examples, the method includes sending a state change notification to a remote instance of an application rendering the first avatar and the second avatar with information about the state change at block 428. For example, the client 104 illustrated in FIG. 1 may send a state change notification to a remote instance of an application rendering the first avatar and the second avatar with information about the state change. For example information about the state change can be information about the pinned state of the portion of the avatar or information that the portion of the avatar has been grabbed and which avatar has control over the portion.

According to some examples, the method includes returning the portion of the avatar to its original state when it is determined that the portion of the avatar has not been pinned at block 426. For example, the client 104 illustrated in FIG. 1 may return the portion of the avatar to its original state when it is determined that the portion of the avatar has not been pinned.

While FIG. 4 has been described in the context of a first avatar interacting with a second avatar, the manipulations of the portions of the avatar configured to exhibit secondary motion behaviors can be from the same avatar. In some embodiments, an avatar might wish to use their hands to manipulate their own hair, tail, ears, clothing, etc. All the aspects described with respect to FIG. 4 work in the same manner when the portions of the avatar configured to exhibit secondary motion behaviors are manipulated by a self interaction or an avatar to avatar interaction, except that mutual consent is not required when interactions are with ones self.

Figure 5C:
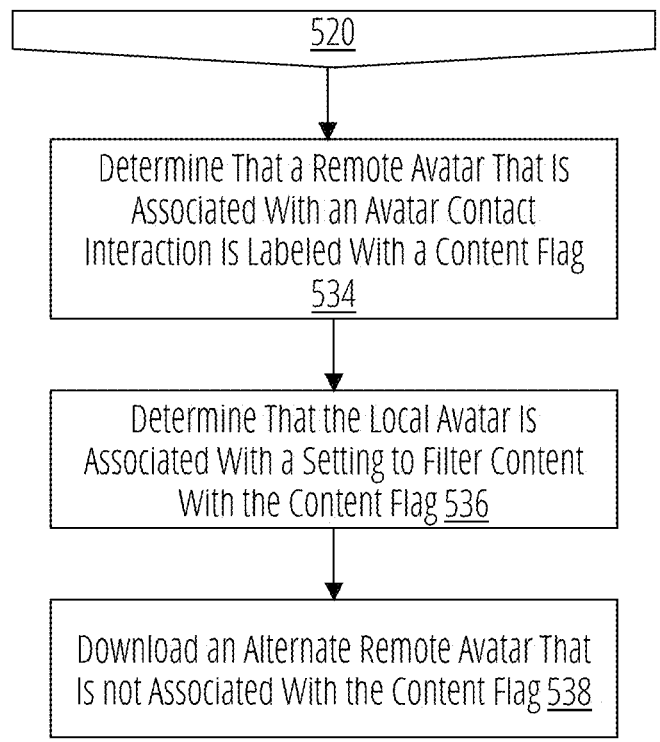

FIG. 5A, FIG. 5B, and FIG. 5C illustrates an example method for determining if avatar contact interactions are permitted. Although the example method depicts a particular sequence of operations, the sequence may be altered without departing from the scope of the present disclosure. For example, some of the operations depicted may be performed in parallel or in a different sequence that does not materially affect the function of the method. In other examples, different components of an example device or system that implements the method may perform functions at substantially the same time or in a specific sequence.

As the present technology is for supporting interactions between avatars or portions of avatars. The present technology also provides a mechanism for ensuring that both participants in an interaction consent to the interaction. Just because contact interactions are supported by their avatar, does not mean that a user wants their avatar to be touched. The nature of virtual reality environments is that user is intimately connected with their avatar. Often users choose to view the world from a first person point of view such that an interaction where one avatar is touching another avatar can be perceived as a first person contact. To the user, the contact can be perceived in a similar way as it would be in real life.

Just as some contact is not welcome in the real world, it is not welcome in a virtual world either. Accordingly, the present technology provides a safety framework that declares a user's consent for touching and that disables contact when it is not desired. Importantly consent must be provided from all parties to the contact.

According to some examples, the method includes receiving avatar contact settings for a first user and at least one second user in a world instance at block 502. For example, the client 104 illustrated in FIG. 1 may receive avatar contact settings for the first user and at least one second user in a world instance.

The avatar contact settings include contact categories. All players configure their user profiles to allow contact or not using the contact categories. The content categories are to (1) allow avatar contact interactions with all avatars, (2) allow avatar contact interactions only with avatars in a friends list, and (3) disallow all avatar contact interactions.

The avatar contact settings also include a permission list and a block list to name specific users/avatars that are excepted from any determination made due to the contact categories. For example, an user that is on a permission list of the local user is affirmatively allowed to interact with the local user's avatar, assuming the remote user's settings permit the interaction. Likewise, a user that is on the block list of the local user is affirmatively disallowed from interacting with the local user's avatar even if the contact categories would normally permit the interaction. The permission list and a block list of named avatars override the contact categories.

Notwithstanding any contact settings configured for a user account, the user account can also toggle interactions with all other avatars on or off user the interactions toggle 216 illustrated in FIG. 2. Accordingly, even a user account that has user account configurations to interact with all other accounts or to interaction with all friends, can utilize the interactions toggle 216 to quickly turn off contact interactions. The interactions toggle 216 can override any other interactions configurations associated with the user account to turn off interactions, but when the interactions toggle 216 is set to allow contact interactions, the allowed interactions are limited by those configured for the user account.

According to some examples, the method includes determining whether there is mutual consent between the pair of avatars to allow avatar contact interactions at decision block 504. For example, the client 104 illustrated in FIG. 1 may determine whether there is mutual consent between the pair of users to allow avatar contact interactions. The determination of whether mutual consent exists is updated whenever users join or leave a world or when any user in the world changes their avatar settings or contact interaction settings. In some embodiments, the determination of whether there is mutual consent is performed without consideration for whether the avatar has been configured with interactions. A user could change their avatar at any time, but the consent remains the same until the determination for mutual consent is updated due to a user leaving or joining a world.

Figure 6:
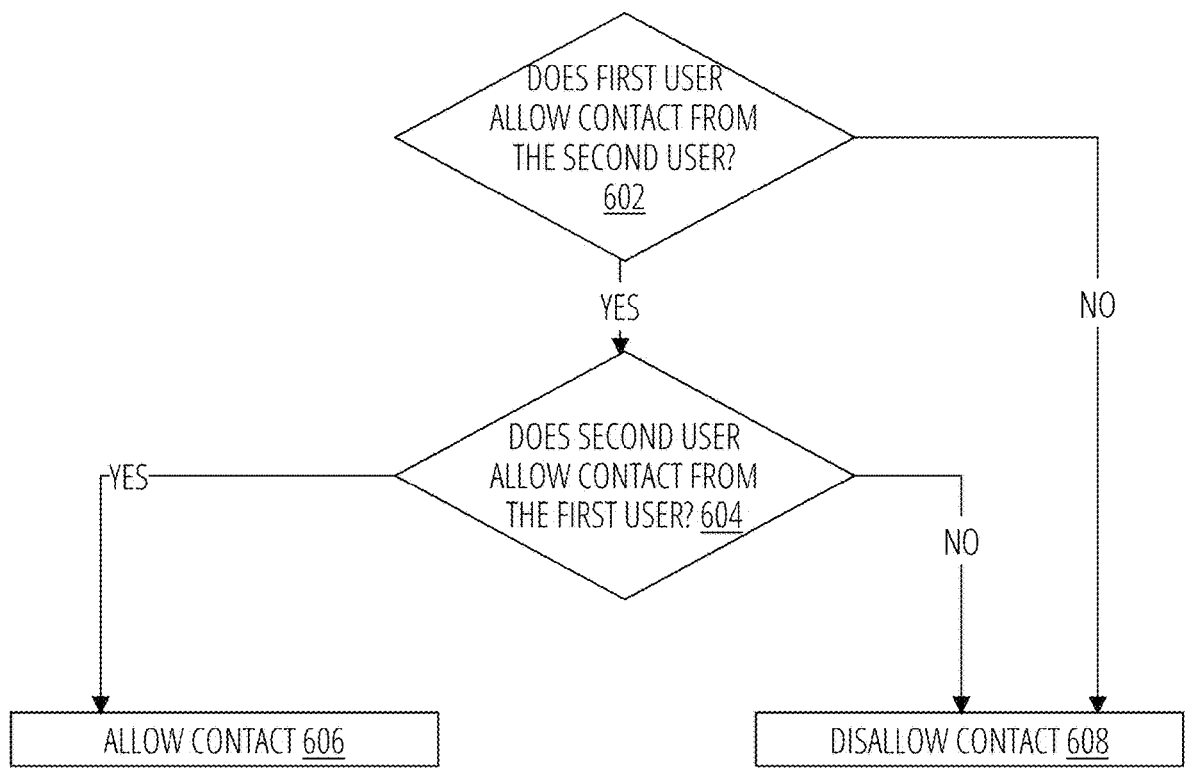
FIG. 6 illustrates an example method of determining whether there is mutual consent between the avatars in the pair to permit the supported contact interaction in accordance with some aspects of the present technology.

The determination of whether there is a mutual consent is a product of the combined contact settings of the users in the pair. FIG. 6 illustrates an example method of determining whether there is mutual consent between the users in the pair to permit the supported contact interaction. The method first determines whether the first user in the pair allows contact with the second user in the pair at decision block 602. The method then determines whether the second user in the pair allows contact with the first user at decision block 604. If the answer to both decision block 602 and decision block 604 is yes, only then will the contact interaction be allowed at block 606. If the answer to either decision block 602 or decision block 604 is no, then the contact interaction is not allowed at block 608. While FIG. 6 (and much of the discussion related to FIG. 5A, FIG. 5B, and FIG. 5C) relate to a pair of users interacting, it should be appreciated that this can be expanded to as many users as can join in a particular contact interaction. If any users that are to be part of the contact interaction do not allow a contact interaction with the other parties to the interaction, then the group of users will not be able to engage in that contact interaction together.

According to some examples, the method includes determining whether either of the avatars in the pair of avatars is configured with a receiver associated with an avatar contact interaction at decision block 506. For example, the client 104 illustrated in FIG. 1 may determine if either of the avatars in the pair of avatars is configured with a receiver associated with an avatar contact interaction. This step is performed by the client 104 for all pairs of avatars in the local world. The purpose of this step is to identify all pairs of avatars that can interact. In some embodiments, for efficiency reasons, this step might only be performed for avatars that are actually being rendered by client 104 in the world instance as the client 104 would not render animations for avatars in the world that are not rendered in the field of view. When it is determined at decision block 506 that neither of the avatars in a pair of avatars has a receiver or a portion of the avatar configured to exhibit secondary motion behaviors, the client 104 can determine at block 508 that there will be no contact interactions between that pair of avatars, since neither avatar has any way of receiving contact interactions.

In effect decision block 506 is used to determine if either avatar in a pair of avatars supports contact interactions.

As noted above, with respect to FIG. 3 the client 104 is responsible for locally detecting and animating avatar interactions so while the client 104 might not have any control over the inputs it receives related to remote avatars, it is responsible for determining whether any animation or effect should be played for a remote avatar due to an interaction between two remote avatars or between the local avatar 118 and the remote avatar 126.

FIG. 7 illustrates an example table of example contact settings and whether those settings result in a contact interaction being allowed or not.

In row 702 both users have a contact category set to allow all interactions, thus, it does not matter whether the users are considered friends, because both allow interactions with all others. The contact is allowed.

In row 704, one user only allows contact interactions with friends, while the other user allows interactions with all users. The interaction is not allowed since the users are not friends (e.g., they are not in a friends list for the user accounts). But in row 706, the users have the same contact category settings, but since the users are friends, the contact interaction is allowed.

In row 708, one of the users does not allow any contact interactions so the settings for the other user are irrelevant. No contact interactions are allowed.

In row 710, the first user allows contact interactions with any user except the user account associated with the second avatar. Thus, since the first user does not allow the contact interaction with the second user, contact is not allowed.

In row 712, the first user does not allow contact interactions with any user except the user account associated with the second avatar. The second avatar allows all interactions. Thus, since both avatars allow contact interactions with each other, contact is allowed.

In row 714, the first user does not allow contact interactions with any user except the user account associated with the second avatar. The second user does not allow contact interactions with any avatar except the user account associated with the first avatar. Thus, since both users allow contact interactions with each other, contact is allowed.

Returning to the discussion of FIG. 5A, which has thus far described the determination of whether contact interactions are permitted between specific users as being carried out by client 104, in some embodiments, the determination of whether there is mutual consent between the pair of users to allow avatar contact interactions can be performed by a networked service such as moderation service 142 or another service.

In some embodiments, an invisible boundary can be created when the pair of avatars for which there is no mutual consent are within a threshold distance of each other to ensure that a contact interaction is not even attempted. In some embodiments, a remote avatar that is not allowed to interact with can be removed from the local player's view of a scene when the remote avatar approaches a threshold distance.

According to some examples, the method includes storing a determination for whether contact interactions are permitted between individual pairs of avatars in the world instance at block 510. For example, the client 104 illustrated in FIG. 1 may store a determination of whether contact interactions are permitted between individual pairs of avatars in the world instance. For instance, once a determination has been made of whether contact interactions are allowed between any pair of avatars in the world instance, this can be recorded in a table and saved for later determinations and for use at block 512.

According to some examples, the method includes displaying an indicator associated with at least one remote avatar indicating an avatar contact interaction status indicating whether avatar contact interactions are allowed between the local avatar and the remote avatar associated with the indicator at block 512. For example, the client 104 illustrated in FIG. 1 may display an indicator associated with at least one remote avatar indicating an avatar contact interaction status. In some embodiments, it can be helpful to identify remote avatars 126 that the local avatar 118 can interact with to the user associated with the local avatar. For example, without any indications, the user controlling the local avatar 118 might wander around attempting to engage in contact interactions with remote avatars that do not support contact interactions or do not permit contact interactions with the local avatar. This might result in a poor user experience. Accordingly, remote avatars that both support contact interactions and that permit the local avatar 118 to engage in contact interactions, can be identified to the user associated with the local avatar 118. The indicator can be a symbol or color of a nameplate associated with the remote avatar 126. The indicator can be that the locations of a receiver on the remote avatar are highlighted or otherwise indicated when the remote avatar 126 allows contact interactions with the local avatar 118. In some embodiments, an indicator associated with the remote avatar 126 can indicate that avatar contact interactions are not allowed too.

According to some examples, the method includes detecting a collision between a collider configured on the first avatar and a receiver on the second avatar at block 514. For example, the client 104 illustrated in FIG. 1 may detect a collision between a collider configured on the first avatar and a receiver on the second avatar. The collision can be detected by a broad phase collision detection system 148 in a matter similar to that described with respect to block 302 in FIG. 3.

According to some examples, the method includes reporting the detected collision to an avatar controller at block 516. For example, the client 104 illustrated in FIG. 1 may report the detected collision to an avatar controller.

The method continues in FIG. 5B at block 518.

According to some examples, the method includes confirming that there is mutual consent between the pair of users after detecting the collision between the collider configured on the local avatar and the receiver on the remote avatar at block 522. For example, the client 104 illustrated in FIG. 1 may confirm that there is mutual consent between the pair of users after detecting the collision between the collider configured on the local avatar and the receiver on the remote avatar. While mutual consent was already determined at decision block 504, in some embodiments, client 104 can confirm that mutual consent still exists before triggering the action.

According to some examples, if mutual consent does not exist between the pair of users, the method includes terminating a process related to the avatar contact interactions at block 532. For example, the client 104 illustrated in FIG. 1 may terminate a process related to the avatar contact interactions.

In some embodiments, an invisible boundary can be created when the pair of avatars for which there is no mutual consent are within a threshold distance of each other to ensure that a contact interaction is not even attempted. In some embodiments, a remote avatar that is not allowed to be interacted with can be removed from the local player's view of a scene when the remote avatar approaches a threshold distance.

In some instances, user settings may also regulate what type of animations they want to engage with. For example, a user might want to engage with other avatars in contact interactions, but they might also want to filter content that is vulgar or suggestive. In such embodiments, the animations liked to a receiver might be labeled with a content flag. This is another way in which user rights, privacy, and boundaries can be put in the control of the user receiving content.

According to some examples, the method includes determining that an animation associated with an avatar contact interaction is labeled with a content flag at block 524. For example, the client 104 illustrated in FIG. 1 may determine that an animation associated with an avatar contact interaction is labeled with a content flag.

According to some examples, the method includes determining that the user account associated with the local avatar is associated with a setting to filter content with the content flag at block 526. For example, the client 104 illustrated in FIG. 1 may determine that the user account is associated with a setting to filter content with the content flag.

According to some examples, the method includes terminating the avatar contact interaction because it is labeled with a filtered type of content at block 528. For example, the client 104 illustrated in FIG. 1 may terminate the avatar contact interaction because it is labeled with a filtered type of content.

According to some examples, if the contact interaction is permitted, and the animation resulting from the contact interaction is not filtered due to the presence of a content flag, the method includes triggering the action at block 530. For example, the client 104 illustrated in FIG. 1 may trigger the action by playing an animation liked to a receiver or by executing the transforms associated with the portion of the avatar configured to exhibit secondary motion behaviors.

After receiving the avatar settings at block 502, in FIG. 5A, the method follows block 520 to FIG. 5C, which illustrates an alternate and/or additional method of handling content labeled with a content flag.

According to some examples, the method includes determining that a remote avatar that is associated with an avatar contact interaction is labeled with a content flag at block 534. For example, the client 104 illustrated in FIG. 1 may determine that a remote avatar that is associated with an avatar contact interaction is labeled with a content flag.

According to some examples, the method includes determining that the local avatar is associated with a setting to filter content with the content flag at block 536. For example, the client 104 illustrated in FIG. 1 may determine that the local avatar is associated with a setting to filter content with the content flag.

According to some examples, the method includes downloading an alternate remote avatar that is not associated with the content flag at block 538. For example, the client 104 illustrated in FIG. 1 may download an alternate remote avatar that is not associated with the content flag by interacting with the avatars API 136 to request alternate assets. Or, in some embodiments, the specific content within the avatar assets that is labeled with the content flag might not be downloaded leaving the rest of the remote avatar and its functions intact, excluding the portion associated with the content flag.

Figure 8:
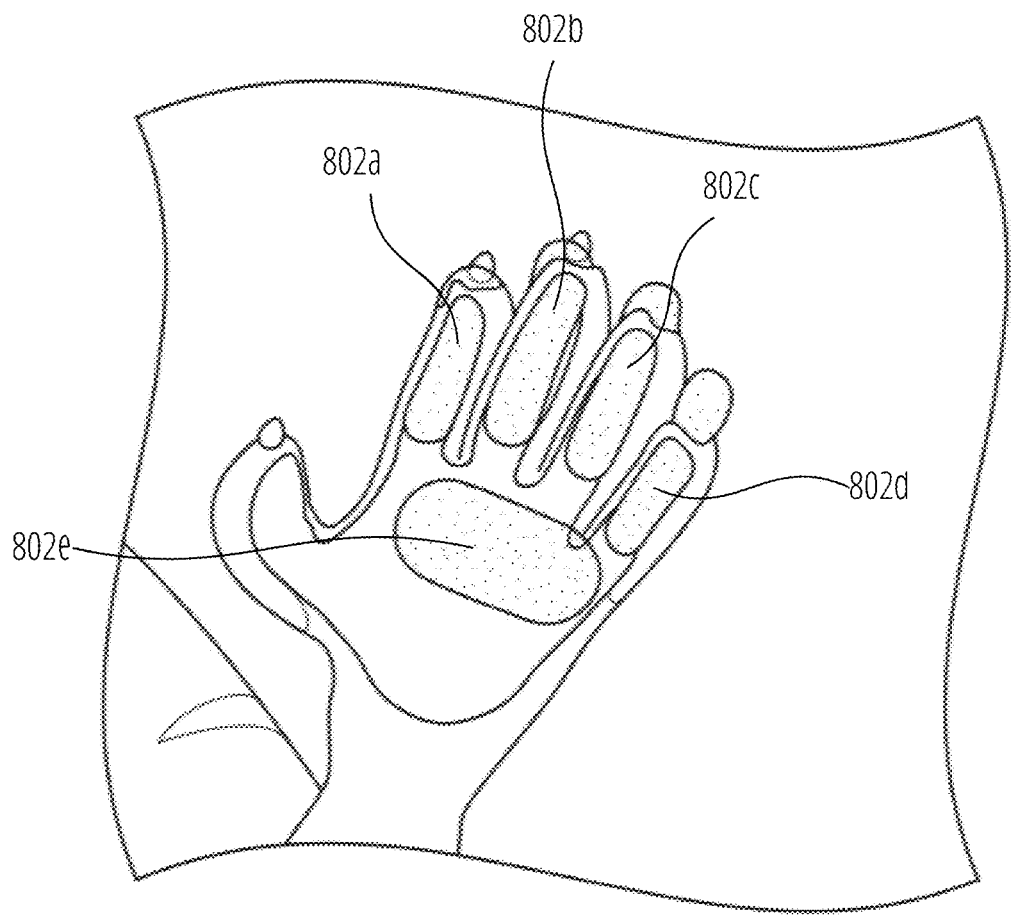
FIG. 8 illustrates a portion of an avatar configured with one or more colliders in accordance with some aspects of the present technology.

FIG. 8 illustrates a portion of an avatar configured with one or more colliders. The present technology includes a software development kit for building avatars that allow users to define portions of their avatars as colliders and receivers.

In some embodiments, some portion of an avatar might automatically be considered a collider, such as portions of hands of other appendages. The present technology also allows a user to define a portion of their avatar as a receiver. Any portion of an avatar can be defined as a collider or a receiver including a portions of humanoid and non-humanoid avatars.

Colliders define the shape of an object for the purposes of physical collisions. A collider, which is generally invisible, need not be the exact same shape as the object and in fact, a rough approximation is often more efficient and indistinguishable in gameplay. In some examples, the collider does not need to behave as a solid object and will simply allow other colliders to pass through it. A receiver can be a collider that is configured with a trigger to cause a resulting effect. When a collider enters its space, a trigger associated with a receiver will call a function to execute scripts configured for the receiver. A scripting system or a physics engine can detect when collisions occur between a collider and a receiver and initiate actions. For example, a receiver can trigger an animation, sound, or other effect when contact from a collider is received by the receiver.

In some embodiments, a receiver is associated with a tag that limits which colliders or types of colliders can interact with the receiver. In such embodiments, an animation can only be triggered by contact from a collider that matches the tag to which the receiver specifies.

For example, FIG. 8 illustrates a hand of an avatar with colliders 802a, 802b, 802c, 802d on the fingers and a collider 802e on the palm of the hand. Colliders are configured to apply interactions to other portions of avatars that are configured with receivers or that are configured with secondary motion attributes and that are responsive to forces applied by colliders.

Figure 9A:
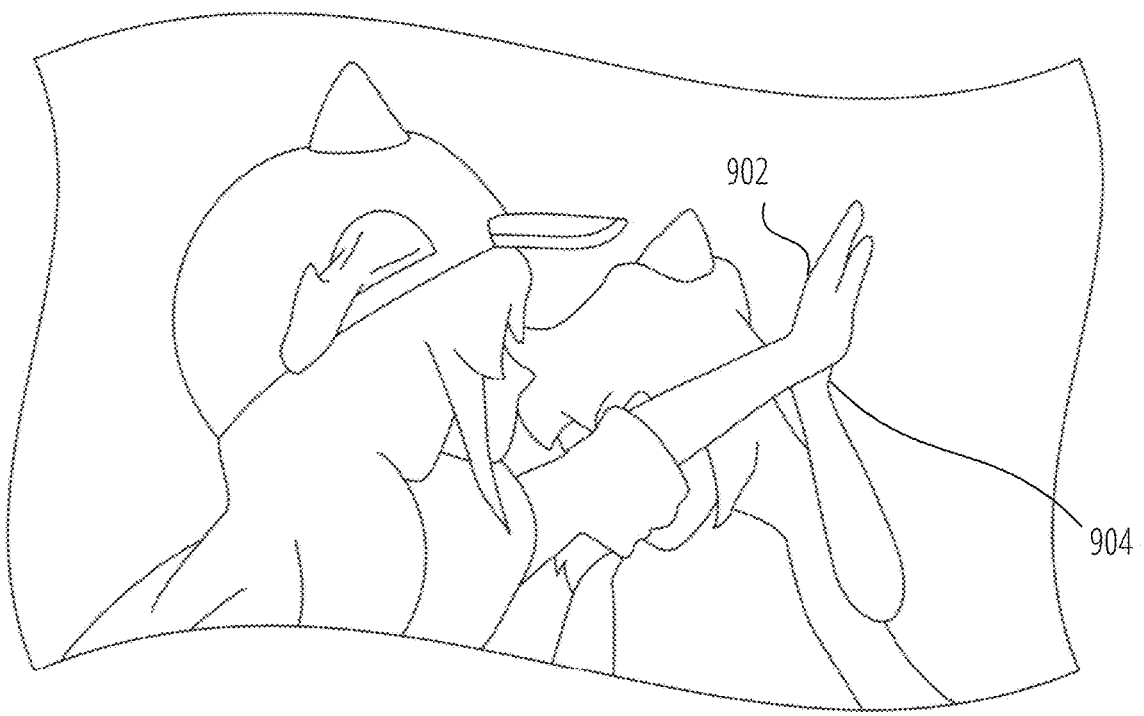
FIG. 9A illustrates two avatars engaged in a contact interaction in accordance with some aspects of the present technology.

FIG. 9A illustrates two avatars engaged in a contact interaction. More specifically two avatars are high-fiving, where a first avatar's hand 902 is making contact with the second avatar's hand 904. While both hands might be configured with colliders, at least one hand is configured with a receiver.

Figure 9B:
FIG. 9B illustrates a moment directly after the high-five contact interaction has occurred in accordance with some aspects of the present technology.

FIG. 9B illustrates a moment directly after the high-five contact interaction has occurred. Hand 906 is configured with a receiver that is linked to an effect to draw an animation of a percussive bubble 908 and to play a slapping sound.

Figure 10:
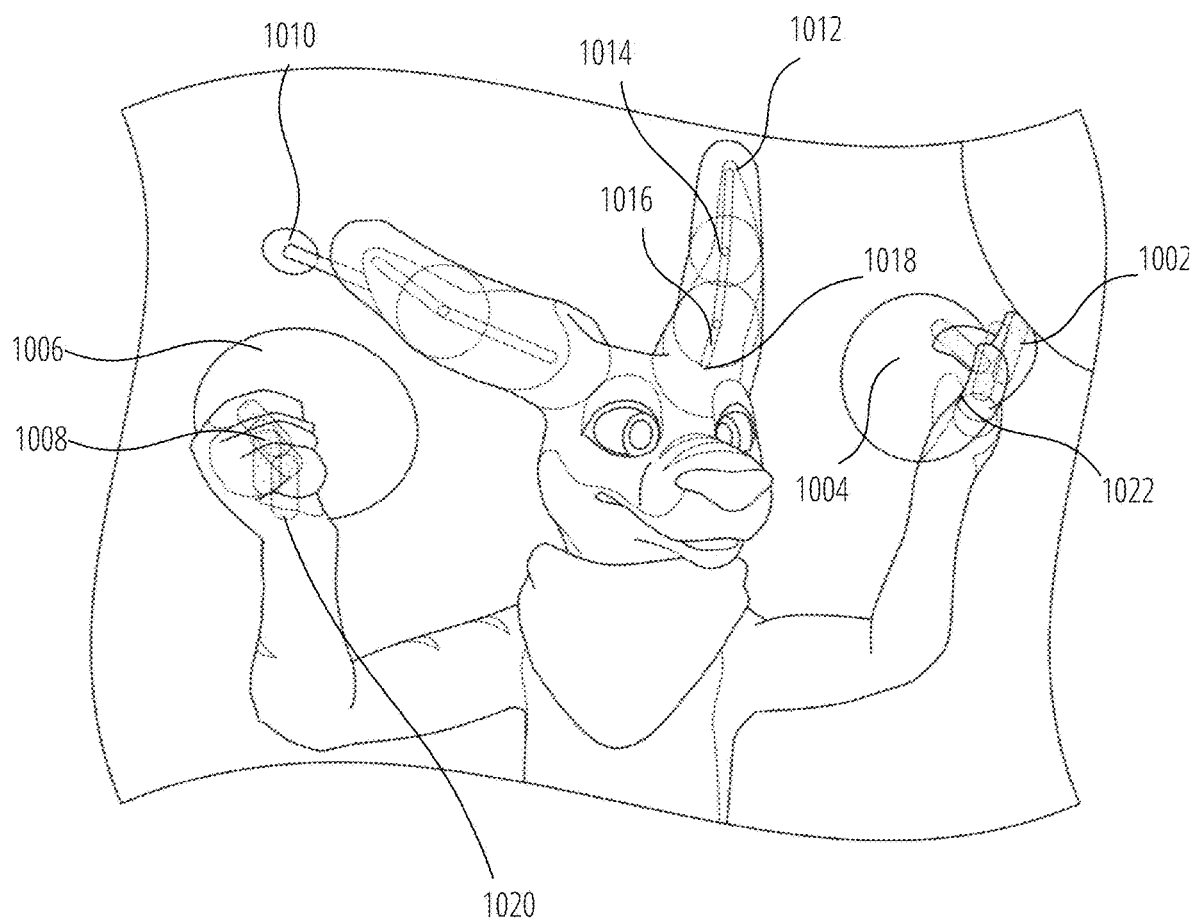
FIG. 10 illustrates an avatar that has portions configured as colliders and portions configured with secondary motion behaviors in accordance with some aspects of the present technology.

FIG. 10 illustrates an avatar that has portions configured as colliders and portions configured with secondary motion behaviors. For example, the avatar has a hand 1020 configured with a collider 1008 and hand 1022 configured with a collider 1002. The avatar also has ears that are configured with secondary motion behaviors. The secondary motion behaviors are provided by a tree of bones where each bone in the tree of bones can be linked to a transform, thus creating a tree of transforms. For example, the avatar as a tree transforms making up its ear. At the root of the transform is the head 1018 followed by the first bone 1016, the second bone 1014, and the third bone 1012. Each of the bones, 1016, 1014, and 1012 is configured with one more transforms that provides characteristics to the ear to allow the ear to bend or to be springy and to be responsive to the forces applied by a collider, inertia, or gravity, etc.

In addition to the tree of transforms, the ears and hands of the avatar shown in FIG. 10 are also configured with attachment points. For example, as illustrated in FIG. 10, hand 1020 has an attachment point 1006, hand 1022 has an attachment point 1004, and the right ear of the avatar has an attachment point 1010. Attachment points can be used as locations in which an object can be grabbed. In FIG. 9 the avatar has shoes hand 1020 to grab on to attachment point 1010.

While the avatar shown in FIG. 10 has space between hand 1020 and the attachment point 1010 the hand 1020 is grabbing the ear by the attachment point 1010. The space can be the result of the fact that the user controlling the avatar has moved the hand of the avatar further than the ear is configured to move. The space could also be the result of a delay in animation wherein the user grabbed the ear at the attachment point at a moment when the hand overlapped the ear, but did not trigger the attachment until after the hand had moved somewhat.

Notwithstanding this explanation, it may not be necessary for one attachment point to overlap another attachment point in order to grab the object. In some embodiments, attachments between attachment points may be based on a relative proximity basis and may not require a hand such as hand 920 to be directly over the ear being grabbed at attachment point 1010.

When the ear is grabbed by attachment point 1010 the avatar can move the ear into various poses using their hand providing a similar effect as to what might have occurred in real life. When an avatar is done manipulating the ear through the attachment point 1010 the avatar can either let go of the ear by opening their hand in which case the ear will return to its default position, or the user controlling the avatar can press the trigger button to pin the ear and leave it in the position in which it was in just before releasing the grab.

While FIG. 10 illustrates an example of an avatar using its own hands to manipulate its own ears this is for convenience of illustration. As described herein, another avatar could just as well have used an attachment point on their avatar to attach and grab the ear at attachment point 1010.

The ears that are configured with secondary motion behaviors can also be manipulated by being pushed or pulled. An avatar can use colliders to apply forces to the ears, which will react based on the attributes associated with the portion of the avatar configured to exhibit secondary motion behaviors. In this way, it is possible for avatars to move their hair, ears, tail, clothing, or these same features on other avatars. Avatars can even comb their hair or the hair of other avatars.

While FIG. 10 illustrates an avatars head (ears) as being configured with secondary motion this is just an example. Any portion of the can be configured with secondary motion behaviors. The avatar can include a complete skeleton of a humanoid avatar or a non-humanoid avatar and various controllers on a user can be mapped to the skeleton of the humanoid avatar or a non-humanoid avatar to cause the skeleton to engage in primary motion. Additionally, any portion of an avatar can be configured with secondary motion behaviors. However, secondary motion behaviors are typically reserved for portions of an avatar that are flexible or pliable, and are not typically used on rigid objects such as the primary skeleton of the avatar as rigid objects are less likely to respond with perceptible movement in response to small forces such as most contact interactions. Common examples of the portion of the avatar configured to exhibit secondary motion behaviors include hair, ears, a tail, clothing, skin, accessories such as jewelry, etc.

Figure 11:
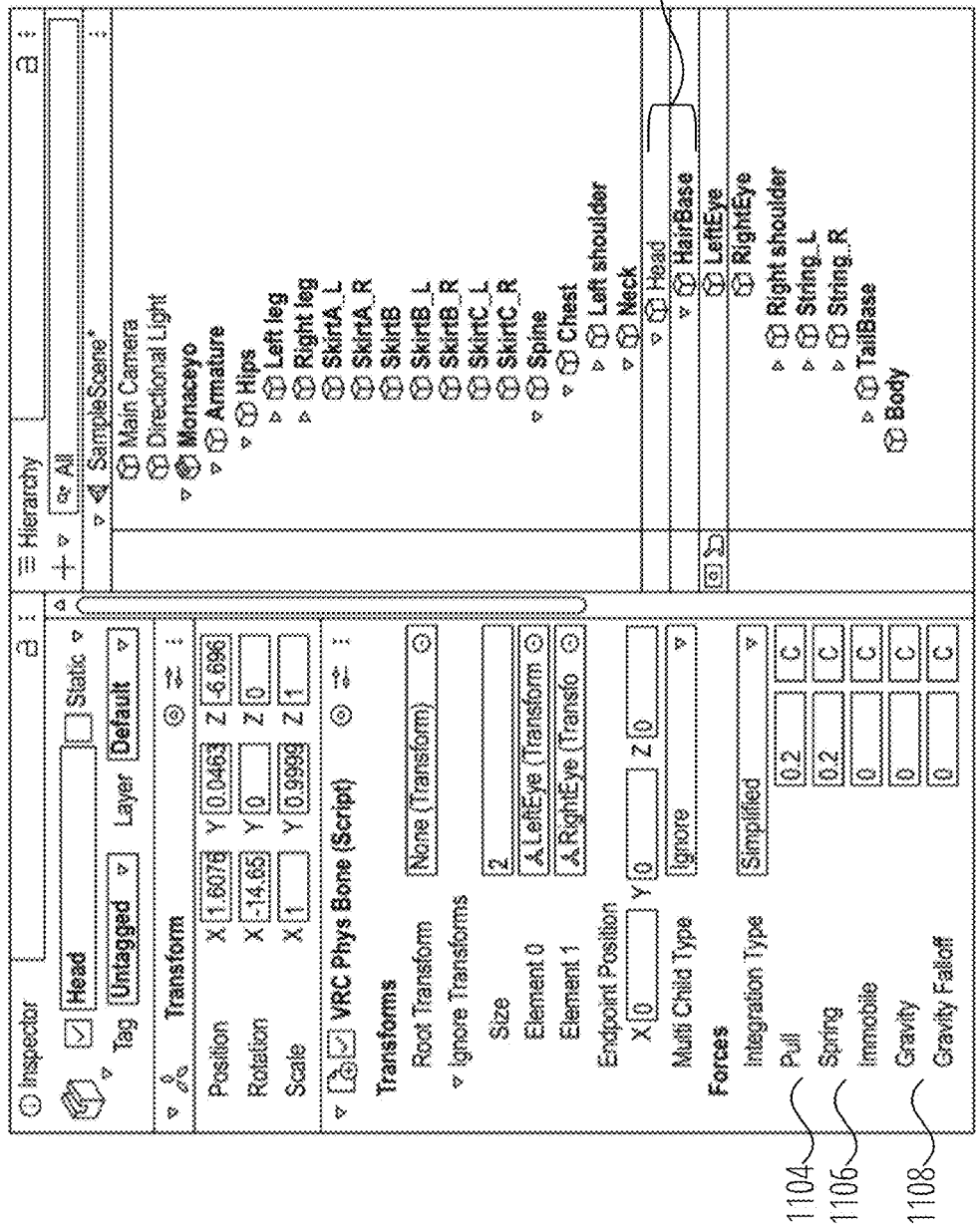
FIG. 11 illustrates an example interface for configuring secondary motion attributes on portions of an avatar in accordance with some aspects of the present technology.

FIG. 11 illustrates an example interface for configuring secondary motion attributes on portions of an avatar. In this example, the secondary motion is applied to hair. The interface includes a collapsed tree of transforms 1102 for hair. The tree of transforms has its base on the head of the avatar and further bones making up the hair are collapsed under the term 'hair base.'

The menu illustrated in FIG. 11 also allows the user to configure parameters related to various forces to define how the bones making up hair should respond to those forces. For example, a force for pulling 1104 can be configured to define how the hair should respond if it is pulled from an attachment point. The spring force 1106 defines how quickly the hair should snap back to its original position after it has been pulled. The pulling could be from an avatar grabbing the hair or another force such as gravity while the avatar is walking. The gravity force 1108 defines to what effect the hair should be reactive to gravity. Some bouncy hair may be slightly less affected by gravity than heavier, long hair. These and other forces can be configured and adjusted to provide the desired motion dynamics to mimic true hair.

While FIG. 11 demonstrates secondary motion being configured for hair, any portion of the avatar can be configured with secondary motion.

While the present technology has been described with respect to contact interactions between avatars, the present technology is also applicable to interactions between avatars and the environment in which the avatar interacts. For example, portions of a world, or objects in a world can be configured with colliders and receivers, and can be configured to exhibit secondary motion behaviors. For example, a user might control their avatar to kick a ball, where the foot of the avatar is configured with a collider and the ball is also configured with a collider and/or a receiver. In another example, a user might walk through a field of grass and their movement through the field could cause the grass, which is configured to exhibit secondary motion behaviors can bend and move as the avatar walks through the grass or as the avatar swishes their tail through the grass. In another example, a user might have trackers on each finger of their avatar to allow individual figure movement to be tracked well enough to utilize individual colliders on the fingers to collide with keys on a virtual keyboard to play the keyboard or the piano.

Just as with respect to the avatar to avatar contact interactions, the world or objects within the world might be configured with interaction permissions such that a user account could only interact with the interactable portions of the world or objects within the world if mutual consent for interactions where present.

Accordingly, while the present technology has primarily been described with respect to avatar to avatar interactions, the present technology is equally applicable to instances where one or both of the avatars is replaced with an object or portion of a world.

Figure 12:
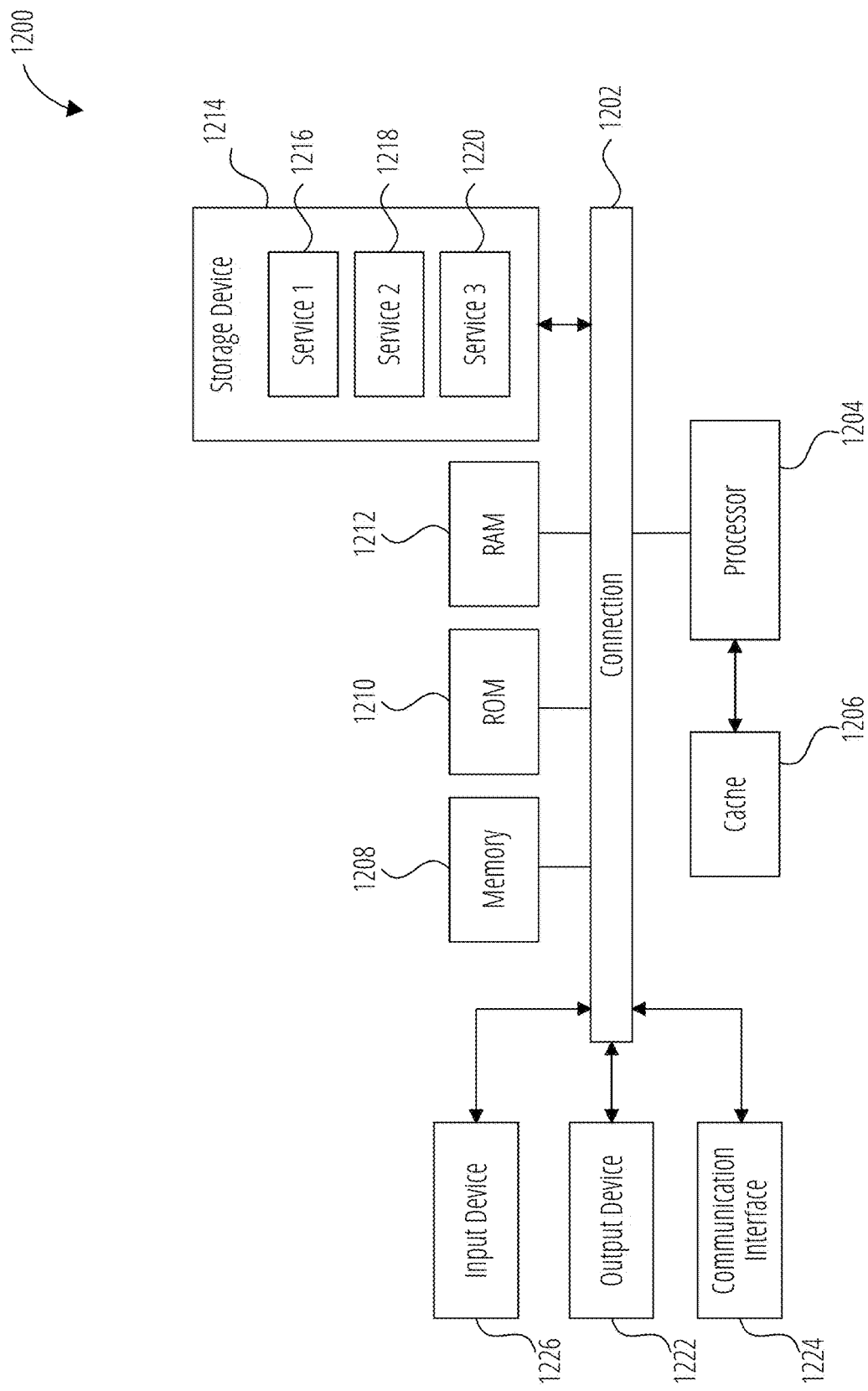
FIG. 12 shows an example of a system for implementing certain aspects of the present technology.

FIG. 12 shows an example of computing system 1200, which can be for example any computing device making up client device 106, or web services 110, or any component thereof in which the components of the system are in communication with each other using connection 1202. Connection 1202 can be a physical connection via a bus, or a direct connection into processor 1204, such as in a chipset architecture. Connection 1202 can also be a virtual connection, networked connection, or logical connection.

In some embodiments, computing system 1200 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example computing system 1200 includes at least one processing unit (CPU or processor) 1204 and connection 1202 that couples various system components including system memory 1208, such as read-only memory (ROM) 1210 and random access memory (RAM) 1212 to processor 1204. Computing system 1200 can include a cache of high-speed memory 1206 connected directly with, in close proximity to, or integrated as part of processor 1204.

Processor 1204 can include any general purpose processor and a hardware service or software service, such as services 1216, 1218, and 1220 stored in storage device 1214, configured to control processor 1204 as well as a special-purpose processor where software instructions are incorporated into the actual processor design. Processor 1204 may essentially be a completely self-contained computing system, containing multiple cores or processors, a bus, memory controller, cache, etc. A multi-core processor may be symmetric or asymmetric.

To enable user interaction, computing system 1200 includes an input device 1226, which can represent any number of input mechanisms, such as a microphone for speech, a touch-sensitive screen for gesture or graphical input, keyboard, mouse, motion input, speech, etc. Computing system 1200 can also include output device 1222, which can be one or more of a number of output mechanisms known to those of skill in the art. In some instances, multimodal systems can enable a user to provide multiple types of input/output to communicate with computing system 1200. Computing system 1200 can include communication interface 1224, which can generally govern and manage the user input and system output. There is no restriction on operating on any particular hardware arrangement, and therefore the basic features here may easily be substituted for improved hardware or firmware arrangements as they are developed.

Storage device 1214 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read-only memory (ROM), and/or some combination of these devices.

The storage device 1214 can include software services, servers, services, etc., that when the code that defines such software is executed by the processor 1204, it causes the system to perform a function. In some embodiments, a hardware service that performs a particular function can include the software component stored in a computer-readable medium in connection with the necessary hardware components, such as processor 1204, connection 1202, output device 1222, etc., to carry out the function.

For clarity of explanation, in some instances, the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer-readable media. Such instructions can comprise, for example, instructions and data which cause or otherwise configure a general purpose computer, special purpose computer, or special purpose processing device to perform a certain function or group of functions. Portions of computer resources used can be accessible over a network. The executable computer instructions may be, for example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smartphones, small form factor personal computers, personal digital assistants, and so on. The functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Aspect 1. A method for triggering an action responsive to a collision between a first avatar and a second avatar, the method comprising: detecting a collision between a collider configured on the first avatar and a receiver on the second avatar; reporting the detected collision to an avatar controller; determining an action for the second avatar associated with the receiver; and triggering the action.

Aspect 2. The method of Aspect 1, wherein the collision is detected by a local instance of an application rendering the first avatar and the second avatar, and the action is triggered by the local instance of the application.

Aspect 3. The method of any of Aspects 1 to 2, further comprising: determining if the action is associated with a persistent state change for the second avatar; when it is determined that the action is associated with the persistent state change to the second avatar, sending a state change notification to a remote instance of an application rendering the first avatar and the second avatar.

Aspect 4. The method of any of Aspects 1 to 3, wherein the second avatar can be a local avatar or remote avatar.

Aspect 5. The method of any of Aspects 1 to 4, wherein the action can be to play a sound effect, or to render an animation.

Aspect 6. The method of any of Aspects 1 to 5, wherein the detecting the collision between the collider and the receiver further includes determining physical attributes associated with the collision, wherein the action can be dependent on the physical attributes.

Aspect 7. The method of any of Aspects 1 to 6, further comprising: prior to triggering the action, determining whether there is mutual consent between the pair of the first avatar and the second avatar to allow the action resulting from the detected collision.

Aspect 8. A method for supporting interactions affecting secondary motion of a portion of an avatar, the method comprising: detecting an interaction between a collider and the portion of the avatar, wherein the portion of the avatar is configured with secondary motion; reporting the detected interaction to an avatar controller; and animating motion for the portion of the avatar as it is manipulated to move by the collider in accordance with the configured secondary motion.

Aspect 9. The method of Aspect 8, further comprising: loading parameters for the portion of the avatar; storing the parameters for the portion of the avatar in a memory.

Aspect 10. The method of any of Aspects 8 to 9, wherein the portion of the avatar is defined by a tree of transforms.

Aspect 11. The method of any of Aspects 8 to 10, further comprising: determining that the interaction between the collider and the portion of the avatar triggers a physics simulation of a transform in the tree of transforms.

Aspect 12. The method of any of Aspects 8 to 11, further comprising: when it is determined that the interaction between the collider and the portion of the avatar triggers a physics simulation of the transform, creating a job with the rendering engine to be handled on a thread other than a primary thread, wherein the job is the physics simulation of the transform.

Aspect 13. The method of any of Aspects 8 to 12, further comprising: checking that the job has been completed by the rendering engine; and when the job has not been completed, instructing the rendering engine to finish the job.

Aspect 14. The method of any of Aspects 8 to 13, wherein the transform is configured to be complied at runtime, wherein the creating the job includes compiling the transform at runtime for execution on the thread other than the primary thread.

Aspect 15. The method of any of Aspects 8 to 14, further comprising: executing the job on the thread other than the main thread to result in the physics simulation of the motion of the portion of the avatar as it is manipulated to move by the collider in accordance with the configured secondary motion.

Aspect 16. The method of any of Aspects 8 to 15, wherein the executing the job utilizes localized physics, localized physics are limited to the interaction between the collider and the properties of the tree of transforms.

Aspect 17. The method of any of Aspects 8 to 16, wherein the memory includes a memory structure that supports access to data in the memory by jobs executing on a plurality of threads.

Aspect 18. The method of any of Aspects 8 to 17, wherein the detecting the interaction between a collider and the portion of the avatar occurs at every frame.

Aspect 19. The method of any of Aspects 8 to 18, further comprising: detecting, by a first instance of a client application that is associated with a local avatar, that a remote avatar has an active receiver configured to accept contact.

Aspect 20. The method of any of Aspects 8 to 19, wherein the detected interaction is a grab, the method further comprising: assigning control over the portion of the avatar that has been grabbed, wherein the portion of the avatar that has been grabbed has an attachment point at the location in which the portion of the avatar has been grabbed.

Aspect 21. The method of any of Aspects 8 to 20, further comprising: determining whether the portion of the avatar has been pinned.

Aspect 22. The method of any of Aspects 8 to 21, further comprising: returning the portion of the avatar to its original state when it is determined that the portion of the avatar has not been pinned.

Aspect 23. The method of any of Aspects 8 to 22, further comprising: determining that the grab has resulted in posing the portion of the avatar; sending a state change notification to a remote instance of an application rendering the first avatar and the second avatar with information about the pinned state of the portion of the avatar.

Aspect 24. The method of any of Aspects 8 to 23, further comprising: prior to animating motion for the portion of the avatar as it is manipulated to move by the collider in accordance with the configured secondary motion, determining whether there is mutual consent between the pair of the first avatar and the second avatar to allow the animated motion.

Aspect 25. The method of any of Aspects 8 to 24, wherein the receiver is configured to only receive interactions from a specified collider.

Aspect 26. The method of any of Aspects 8 to 25, wherein the specified collider is a class of collider such as a collider on a finger or hand, or the specified collider is on a specific avatar, or the specified collider on a category of avatar such as a humanoid avatar.

Aspect 27. A method of determining if avatar contact interactions are permitted, the method comprising: receiving avatar contact settings for a local avatar and at least one remote avatar in a world instances; for a pair of avatars in the world instance, determining whether there is mutual consent between the pair of avatars to allow avatar contact interactions; display an indicator associated with the at least one remote avatar indicating an avatar contact interaction status indicating whether avatar contact interactions are allowed between the local avatar and the remote avatar.

Aspect 28. The method of Aspect 27, wherein the determining whether there is mutual consent between the pair of avatars to allow avatar contact interactions takes place on an instance of a client application.

Aspect 29. The method of any of Aspects 27 to 28, wherein the determining whether there is mutual consent between the pair of avatars to allow avatar contact interactions is performed by a networked service.

Aspect 30. The method of any of Aspects 27 to 29, wherein the avatar contact settings include contact categories to allow avatar contact interactions with all avatars, allow avatar contact interactions only with avatars in a friends list, and to disallow all avatar contact interactions.

Aspect 31. The method of any of Aspects 27 to 30, wherein the list of named avatars associated with the setting overrides the contact categories.

Aspect 32. The method of any of Aspects 27 to 31, wherein the avatar contact settings include a list of named avatars associated with setting to allow or disallow avatar contact interactions.

Aspect 33. The method of any of Aspects 27 to 32, further comprising: storing, for the pair of avatars in the world instance, the determination of whether there is mutual consent between the pair of avatars to allow avatar contact interactions in metadata associated with the remote avatar.

Aspect 34. The method of any of Aspects 27 to 33, further comprising: detecting a collision between a collider configured on the local avatar and a receiver on the remote avatar; reporting the detected collision to an avatar controller; when there is mutual consent between the pair of avatars to allow avatar contact interactions, determining an action for the remote avatar associated with the receiver; and triggering the action.

Aspect 35. The method of any of Aspects 27 to 34, further comprising: confirming that there is mutual consent between the pair of avatars after detecting the collision between the collider configured on the local avatar and the receiver on the remote avatar, and the triggering the action.

Aspect 36. The method of any of Aspects 27 to 35, further comprising: detecting a collision between a collider configured on the local avatar and a receiver on the remote avatar; reporting the detected collision to an avatar controller; when there is not mutual consent between the pair of avatars to allow avatar contact interactions, terminating a process related to the avatar contact interactions.

Aspect 37. The method of any of Aspects 27 to 36, further comprising: in some embodiments, the invisible boundary is created when the pair of avatars for which there is not mutual consent are within a threshold distance of each other.

Aspect 38. The method of any of Aspects 27 to 37, further comprising: determining that system safety setting prohibit animations from remote avatars; detecting a collision between a collider configured on the local avatar and a receiver on the remote avatar;

terminating the avatar contact interactions because the system safety setting prohibits an animation to result from the avatar contact interaction.

Aspect 39. The method of any of Aspects 27 to 38, further comprising: determining that system safety setting prohibits animations from remote avatars, wherein the indicator associated with the at least one remote avatar indicating an avatar contact interaction status indicates that avatar contact interactions are not allowed as a result of the system safety setting.

Aspect 40. The method of any of Aspects 27 to 39, further comprising: determining that an animation associated with an avatar contact interaction is labeled with a content flag; determining that the local avatar is associated with a setting to filter content with the content flag; terminating the avatar contact interaction because it is labeled with a filtered type of content.

Aspect 41. The method of any of Aspects 27 to 40, further comprising: determining that a remote avatar that is associated with an avatar contact interaction is labeled with a content flag; determining that the local avatar is associated with a setting to filter content with the content flag; and download an alternate remote avatar that is not associated with the content flag.

Aspect 42. The method of any of Aspects 27 to 41, further comprising: prior to the determining whether there is mutual consent between the pair of avatars, determining if either of the avatars in the pair of avatars are configured with a receiver associated with an avatar contact interaction.

What is claimed is:

1. A method for triggering an action responsive to a collision between a collider of a first avatar and a receiver portion of a second avatar configured to react to the collision, the method comprising:

detecting the collision between the collider of the first avatar and the receiver of the second avatar, wherein the receiver is defined in assets for the second avatar and is linked to an animation or an effect, the animation or the effect is defined in the assets for the second avatar, the receiver is configured to trigger the animation or the effect responsive to the collision;

reporting the detected collision to an avatar controller associated with the second avatar; and playing the animation or a custom effect to which the receiver is linked in response to the collision.

2. The method of claim 1, wherein the portion of the second avatar configured to react to the collision is configured with secondary motion behaviors, wherein the secondary motion behaviors are configured for portions of the second avatar other than a primary skeleton of the second avatar.

3. The method of claim 2, wherein the playing the animation resulting from the detected collision further comprises:
animating motion for the portion of the second avatar as it is manipulated to move by the collider in accordance with the configured secondary motion.

4. The method of claim 2, further comprising:
determining that the collision between the collider and the receiver of the second avatar triggers a physics simulation of a transform in a tree of transforms that make up the portion of the second avatar configured with the secondary motion behaviors.

5. The method of claim 4, further comprising:
when it is determined that an interaction between the collider and the receiver of the second avatar triggers the physics simulation of the transform, passing information about the interaction to a job to be handled on a thread other than a primary thread, wherein the job is the physics simulation of the transform.

6. The method of claim 1, further comprising:
determining if the action is associated with a persistent state change to the second avatar;
and when it is determined that the action is associated with the persistent state change to the avatar, sending a state change notification to a remote instance of an application rendering the first avatar and the second avatar.

7. The method of claim 1, further comprising:
prior to playing the animation or the custom effect, determining whether there is mutual consent between the first avatar and the second avatar to allow the animation or the custom effect resulting from the detected collision, wherein mutual consent exists when the first avatar and the second avatar have enabled a setting permitting the collision.

8. The method of claim 1, wherein the first avatar and the second avatar are located in a 3-D virtual world, and the first avatar is controlled to cause the collision in response to movements received by a tracking service.

9. The method of claim 1, wherein the collision is detected by a local instance of an application rendering the first avatar and the second avatar, and the animation or the custom effect is triggered by the local instance of the application.

10. The method of claim 1, wherein the second avatar can be a local avatar or remote avatar.

11. The method of claim 1, wherein the detecting the collision between the collider and the receiver further includes determining physical attributes associated with the collision, wherein the animation or the custom effect can be dependent on the physical attributes.

12. The method of claim 1, further comprising:
in response to detecting the collision, evaluating one or more physical attributes of the collision, including velocity, force, or mass, wherein the evaluating includes a determination of whether the physical attributes satisfy a predetermined threshold for triggering the animation or the effect, wherein the response is executed when the physical attributes satisfy the predetermined threshold.

13. A non-transitory computer-readable storage medium comprising instructions that when executed by a computer, cause the computer to:
detect a collision between a collider of a first avatar and a receiver of a second avatar configured to react to the collision, wherein the receiver is defined in assets for the second avatar and is linked to an animation or an effect, the animation or the effect is defined in the assets for the second avatar, the receiver is configured to trigger the animation or the effect in response to the collision;
report the detected collision to an avatar controller associated with the second avatar; and
play the animation or a custom effect to which the receiver is linked in response a to the collision.

14. The non-transitory computer-readable storage medium of claim 13, wherein the receiver is attached to a portion of the avatar configured to react to the collision is configured with secondary motion behaviors, wherein the secondary motion behaviors are configured for portions of the second avatar other than a primary skeleton of the second avatar.

15. The non-transitory computer-readable storage medium of claim 14, wherein the playing the animation results from the detected collision, wherein the instructions further configure the computer to:
animate motion for a portion of the avatar attached to the receiver as it is manipulated to move by the collider in accordance with the configured secondary motion.

16. The non-transitory computer-readable storage medium of claim 14, wherein the instructions further configure the computer to:
determine that the collision between the collider and a portion of the second avatar attached to the receiver triggers a physics simulation of a transform in a tree of transforms that make up the portion of the second avatar configured with the secondary motion behaviors.

17. The non-transitory computer-readable storage medium of claim 16, wherein the instructions further configure the computer to:
when it is determined that an interaction between the collider and the receiver of the second avatar triggers the physics simulation of the transform, pass information about the interaction to a job to be handled on a thread other than a primary thread, wherein the job is the physics simulation of the transform.

18. A computing system comprising:
a processor; and
a memory storing instructions that, when executed by the processor, configure the system to:
detect a collision between a collider of a first avatar and a receiver of a second avatar configured to react to the collision, wherein the receiver is defined in assets for the second avatar and is linked to an animation or an effect, the animation or the effect is defined in the assets for the second avatar, the receiver is configured to trigger the animation or the effect in response to the collision;
report the detected collision to an avatar controller associated with the second avatar; and
play the animation or a custom effect to which the receiver is linked in response to the collision.

19. The computing system of claim 18, wherein the receiver is attached to a portion of the second avatar configured to react to the collision is configured with secondary motion behaviors, wherein the secondary motion behaviors are configured for portions of the second avatar other than a primary skeleton of the second avatar.

20. The computing system of claim 19, wherein the playing the animation to collision results from the detected collision, wherein the computing system is configured to:
animate motion for the portion of the second avatar as it is manipulated to move by the collider in accordance with the configured secondary motion.

* * * * *